United States Patent
Kawase et al.

(10) Patent No.: US 8,331,710 B2
(45) Date of Patent: Dec. 11, 2012

(54) IMAGE PROCESSING APPARATUS AND METHOD, LEARNING APPARATUS AND METHOD, AND PROGRAM

(75) Inventors: Tomonori Kawase, Tokyo (JP); Kunio Kawaguchi, Kanagawa (JP); Takeharu Nishikata, Saitama (JP); Yasuaki Takahashi, Kanagawa (JO); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1083 days.

(21) Appl. No.: 12/257,834

(22) Filed: Oct. 24, 2008

(65) Prior Publication Data

US 2009/0123083 A1    May 14, 2009

(30) Foreign Application Priority Data

Nov. 6, 2007 (JP) .............................. P2007-288457
May 29, 2008 (JP) .............................. P2008-140684

(51) Int. Cl.
*G06K 9/40* (2006.01)
(52) U.S. Cl. ..................................... 382/254
(58) Field of Classification Search .................. None
See application file for complete search history.

(56) References Cited

U.S. PATENT DOCUMENTS

| 2004/0234160 A1* | 11/2004 | Kondo ........................... 382/261 |
| 2007/0165112 A1* | 7/2007 | Shinmei et al. ............. 348/222.1 |
| 2008/0063308 A1* | 3/2008 | Sato et al. ..................... 382/300 |

FOREIGN PATENT DOCUMENTS

| JP | 6-121290 | 4/1994 |
| JP | 9-172621 | 6/1997 |

* cited by examiner

*Primary Examiner* — Bhavesh Mehta
*Assistant Examiner* — Nirav G Patel
(74) *Attorney, Agent, or Firm* — Oblon, Spivak, McClelland, Maier & Neustadt, L.L.P.

(57) ABSTRACT

An image processing method includes determining whether an image is corrupted, extracting class taps used for classification of a pixel to be generated, performing classification of the pixel to be generated by using the class taps, extracting prediction taps used for prediction of the pixel to be generated, and generating an image by predictively calculating a pixel value of the pixel to be generated by using the prediction taps and prediction coefficients for the class of the pixel among a first prediction coefficient set if the subject pixel is determined as a pixel representing a corrupted image, and by predictively calculating a pixel value of the pixel to be generated by using the prediction taps and prediction coefficients for the class of the pixel to be generated among a second prediction coefficient set if the subject pixel is determined as a pixel representing an uncorrupted image.

4 Claims, 35 Drawing Sheets

FIG. 33

| | MC1 | MC2 | MC3 | MC4 |
|---|---|---|---|---|
| COEFFICIENT SEED S1 | RESOLUTION ENHANCING COEFFICIENT | RESOLUTION ENHANCING COEFFICIENT | RESOLUTION ENHANCING COEFFICIENT | CORRUPTION COUNTERMEASURE COEFFICIENT |
| COEFFICIENT SEED S2 | RESOLUTION ENHANCING COEFFICIENT | RESOLUTION ENHANCING COEFFICIENT | RESOLUTION ENHANCING COEFFICIENT | RESOLUTION ENHANCING COEFFICIENT |
| COEFFICIENT SEED S3 | CORRUPTION COUNTERMEASURE COEFFICIENT | CORRUPTION COUNTERMEASURE COEFFICIENT | CORRUPTION COUNTERMEASURE COEFFICIENT | CORRUPTION COUNTERMEASURE COEFFICIENT |

IMAGE PROCESSING APPARATUS AND METHOD, LEARNING APPARATUS AND METHOD, AND PROGRAM

CROSS REFERENCES TO RELATED APPLICATIONS

The present invention contains subject matter related to Japanese Patent Application JP 2007-288457 filed in the Japanese Patent Office on Nov. 6, 2007 and Japanese Patent Application JP 2008-140684 filed in the Japanese Patent Office on May 29, 2008, the entire contents of which are incorporated herein by reference.

BACKGROUND OF THE INVENTION

1. Field of the Invention

The present invention relates to image processing apparatuses and methods, learning apparatuses and methods, and programs. More specifically, the present invention relates to an image processing apparatus and method, a learning apparatus and method, and a program relating to processing of images.

2. Description of the Related Art

As an example of related art, there has been proposed an image converting apparatus that takes an average of a plurality of motion vectors detected from television signals, and that performs a frame interpolation process by using vector data representing the average motion and the television signals. (See, for example, Japanese Unexamined Patent Application Publication No. 6-121290.)

As another example of related art, there has been proposed a method in which a region with motion and the amount of motion are detected from multiple sub-Nyquist sampling encoding (MUSE) signals and motion vectors, frames or fields are interpolated in consideration of the motion vector between still images of the MUSE signals, classification is performed on the basis of edge data and a pattern of distribution of the levels of neighboring pixels used for interpolation, intra-field or intra-frame interpolation is performed by using coefficient data that has been read, and the still images are combined with moving images by a ratio determined in accordance with the region of motion and the amount of motion. (See, for example, Japanese Unexamined Patent Application Publication No. 9-172621.)

SUMMARY OF THE INVENTION

According to these arts, however, if vectors used for interpolation are not correct, edges or the like that do not actually exit might occur, which results in corruption of a generated image. Such a corruption is apparent as degradation of the image, so that the quality of the image is degraded.

For example, in a case where the frame frequency is converted based on motion vector detection, as shown in FIG. 1, motion vectors are detected between a frame at time t (hereinafter referred to as a frame t) and a frame at time t+1 (hereinafter referred to as a frame t+1), which is after the frame t by one frame, and detected vectors are assigned on an interpolated frame at a time ratio of $k:(1-k)$ on a pixel-by-pixel basis. Then, the pixel value of an interpolated pixel p is calculated by linear interpolation according to equation (1), using an inverse ratio $(1-k):k$ with a start pixel q and an end pixel r of the assigned vector. In equation (1), $Ft+k(p)$ denotes the pixel value of the pixel p at time t+k, $Ft(q)$ denotes the pixel value of the pixel q at time t, and $Ft+1(r)$ denotes the pixel value of the pixel r at time t+1.

$$Ft+k(p)=(1-k)\cdot Ft(q)+k\cdot Ft+1(r) \quad (1)$$

Depending on the content of the image, however, problems could arise regarding covered/uncovered regions, repetitive patterns, or the like. In some cases, this results in a failure to assign motion vectors appropriately to an interpolated frame. For example, as shown in FIG. 2, instead of a motion vector Va (indicated by a dotted line), which should be assigned to the interpolated pixel p, another motion vector Vb might be assigned to the interpolated pixel p. As a result, although the pixel value of the interpolated pixel p should be calculated by using a start pixel q1 and an end pixel r1 of the motion vector Va, the pixel value of the interpolated pixel is estimated from a start pixel q2 and an end pixel r2 of the motion vector Vb. This results in corruption of the image of the interpolated frame.

It is desired that corruption of a generated image be made less apparent.

According to a first embodiment of the present invention, there is provided an image processing apparatus. The image processing apparatus includes determining means for determining whether an image is corrupted at a pixel constituting a second image, the second image being generated by a frame interpolation process, the frame interpolation process being a process of detecting a motion vector on a frame of a first image, assigning the motion vector detected to a pixel on a frame of the second image, and generating a pixel value of the pixel on the frame of the second image on the basis of the motion vector assigned; class-tap extracting means for extracting from the second image, as class taps, a plurality of predetermined pixels of the second image, the plurality of predetermined pixels including a subject pixel under consideration in the second image, and the plurality of predetermined pixels being used for classification of a pixel to be generated of a third image into one of a plurality of classes, the third image having a higher resolution than the second image, and the pixel to be generated being located at a position corresponding to the subject pixel of the second image; classifying means for performing classification of the pixel to be generated by using the class taps; prediction-tap extracting means for extracting from the second image, as prediction taps, a plurality of predetermined pixels of the second image, the plurality of predetermined pixels including the subject pixel and being used for prediction of the pixel to be generated; and predictive calculating means for generating the third image by predictive calculation, the predictive calculating means predictively calculating a pixel value of the pixel to be generated by using the prediction taps and using prediction coefficients for the class of the pixel to be generated determined by the classifying means among a first prediction coefficient set in a case where the subject pixel is determined by the determining means as a pixel representing a corrupted image, the first prediction coefficient set including prediction coefficients obtained in advance by using pixels representing corrupted images, and the predictive calculating means predictively calculating a pixel value of the pixel to be generated by using the prediction taps and using prediction coefficients for the class of the pixel to be generated determined by the classifying means among a second prediction coefficient set in a case where the subject pixel is determined by the determining means as a pixel representing an uncorrupted image, the second prediction coefficient set including prediction coefficients obtained in advance by using pixels representing uncorrupted images.

The determining means may calculate a value representing variation between the motion vector assigned to the subject pixel of the second image and motion vectors assigned to neighboring pixels in a predetermined neighboring range of the subject pixel, and determine whether the image is corrupted at the subject pixel on the basis of the value representing variation between these motion vectors.

Furthermore, according to the first embodiment of the present invention, there is provided an image processing method or program. The image processing method or program includes the steps of determining whether an image is corrupted at a pixel constituting a second image, the second image being generated by a frame interpolation process, the frame interpolation process being a process of detecting a motion vector on a frame of a first image, assigning the motion vector detected to a pixel on a frame of the second image, and generating a pixel value of the pixel on the frame of the second image on the basis of the motion vector assigned; extracting from the second image, as class taps, a plurality of predetermined pixels of the second image, the plurality of predetermined pixels including a subject pixel under consideration in the second image, and the plurality of predetermined pixels being used for classification of a pixel to be generated of a third image into one of a plurality of classes, the third image having a higher resolution than the second image, and the pixel to be generated being located at a position corresponding to the subject pixel of the second image; performing classification of the pixel to be generated by using the class taps; extracting from the second image, as prediction taps, a plurality of predetermined pixels of the second image, the plurality of predetermined pixels including the subject pixel and being used for prediction of the pixel to be generated; and generating the third image by predictively calculating a pixel value of the pixel to be generated by using the prediction taps and using prediction coefficients for the class of the pixel to be generated according to the classification among a first prediction coefficient set in a case where the subject pixel is determined as a pixel representing a corrupted image, the first prediction coefficient set including prediction coefficients obtained in advance by using pixels representing corrupted images, and by predictively calculating a pixel value of the pixel to be generated by using the prediction taps and using prediction coefficients for the class of the pixel to be generated according to the classification among a second prediction coefficient set in a case where the subject pixel is determined as a pixel representing an uncorrupted image, the second prediction coefficient set including prediction coefficients obtained in advance by using pixels representing uncorrupted images.

In the image processing apparatus, image processing method, or program according to the first embodiment of the present invention, it is determined whether an image is corrupted at a pixel constituting a second image. The second image is generated by a frame interpolation process, which is a process of detecting a motion vector on a frame of a first image, assigning the motion vector detected to a pixel on a frame of the second image, and generating a pixel value of the pixel on the frame of the second image on the basis of the motion vector assigned. Furthermore, as class taps, a plurality of predetermined pixels of the second image are extracted from the second image. The plurality of predetermined pixels includes a subject pixel under consideration in the second image, and is used for classification of a pixel to be generated of a third image into one of a plurality of classes. The third image has a higher resolution than the second image. The pixel to be generated is located at a position corresponding to the subject pixel of the second image. Furthermore, classification of the pixel to be generated is performed by using the class taps. Furthermore, as prediction taps, a plurality of predetermined pixels of the second image is extracted from the second image. The plurality of predetermined pixels includes the subject pixel and is used for prediction of the pixel to be generated. The third image is generated by predictively calculating a pixel value of the pixel to be generated by using the prediction taps and using prediction coefficients for the class of the pixel to be generated according to the classification among a first prediction coefficient set in a case where the subject pixel is determined as a pixel representing a corrupted image. The first prediction coefficient set includes prediction coefficients obtained in advance by using pixels representing corrupted images. On the other hand, the third image is generated by predictively calculating a pixel value of the pixel to be generated by using the prediction taps and using prediction coefficients for the class of the pixel to be generated according to the classification among a second prediction coefficient set in a case where the subject pixel is determined as a pixel representing an uncorrupted image. The second prediction coefficient set includes prediction coefficients obtained in advance by using pixels representing uncorrupted images.

According to a second embodiment of the present invention, there is provided a learning apparatus. The learning apparatus includes determining means for determining whether an image is corrupted at a pixel constituting a second image, the second image being generated by a frame interpolation process, the frame interpolation process being a process of detecting a motion vector on a frame of a first image, assigning the motion vector detected to a pixel on a frame of the second image, and generating a pixel value of the pixel on the frame of the second image on the basis of the motion vector assigned; class-tap extracting means for extracting from the second image, as class taps, a plurality of predetermined pixels of the second image in a case where a subject pixel under consideration in the second image is determined by the determining means as a pixel representing a corrupted image, the plurality of predetermined pixels including the subject pixel, and the plurality of predetermined pixels being used for classification of a pixel to be generated of a third image into one of a plurality of classes, the third image having a higher resolution than the second image, and the pixel to be generated being located at a position corresponding to the subject pixel of the second image; classifying means for performing classification of the pixel to be generated by using the class taps; prediction-tap extracting means for extracting from the second image, as prediction taps, a plurality of predetermined pixels of the second image, the plurality of predetermined pixels including the subject pixel and being used for prediction of the pixel to be generated; and calculating means for extracting a pixel value of a pixel corresponding to the pixel to be generated from a teacher image having the same resolution as the third image, the teacher image being an image that is not corrupted by an error of a motion vector, and calculating prediction coefficients for the class of the pixel to be generated by using the extracted pixel value and the prediction taps, the prediction coefficients being used to predict a pixel value of the pixel to be generated from the prediction taps.

The determining means may calculate a value representing variation between the motion vector assigned to the subject pixel of the second image and motion vectors assigned to neighboring pixels in a predetermined neighboring range of the subject pixel, and determine whether the image is corrupted at the subject pixel on the basis of the value representing variation between these motion vectors.

Furthermore, according to the second embodiment of the present invention, there is provided a learning method or program. The learning method or program includes the steps of determining whether an image is corrupted at a pixel constituting a second image, the second image being generated by a frame interpolation process, the frame interpolation process being a process of detecting a motion vector on a frame of a first image, assigning the motion vector detected to a pixel on a frame of the second image, and generating a pixel value of the pixel on the frame of the second image on the basis of the motion vector assigned; extracting from the second image, as class taps, a plurality of predetermined pixels of the second image in a case where a subject pixel under consideration in the second image is determined as a pixel representing a corrupted image, the plurality of predetermined pixels including the subject pixel, and the plurality of predetermined pixels being used for classification of a pixel to be generated of a third image into one of a plurality of classes, the third image having a higher resolution than the second image, and the pixel to be generated being located at a position corresponding to the subject pixel of the second image; performing classification of the pixel to be generated by using the class taps; extracting from the second image, as prediction taps, a plurality of predetermined pixels of the second image, the plurality of predetermined pixels including the subject pixel and being used for prediction of the pixel to be generated; and extracting a pixel value of a pixel corresponding to the pixel to be generated from a teacher image having the same resolution as the third image, the teacher image being an image that is not corrupted by an error of a motion vector, and calculating prediction coefficients for the class of the pixel to be generated by using the extracted pixel value and the prediction taps, the prediction coefficients being used to predict a pixel value of the pixel to be generated from the prediction taps.

In the learning apparatus, learning method, or program according to the second embodiment of the present invention, it is determined whether an image is corrupted at a pixel constituting a second image. The second image is generated by a frame interpolation process, which is a process of detecting a motion vector on a frame of a first image, assigning the motion vector detected to a pixel on a frame of the second image, and generating a pixel value of the pixel on the frame of the second image on the basis of the motion vector assigned. Furthermore, as class taps, a plurality of predetermined pixels of the second image are extracted from the second image in a case where it is determined that a subject pixel under consideration in the second image is a pixel representing a corrupted image. The plurality of predetermined pixels includes the subject pixel and is used for classification of a pixel to be generated of a third image into one of a plurality of classes. The third image has a higher resolution than the second image. The pixel to be generated is located at a position corresponding to the subject pixel of the second image. Furthermore, classification of the pixel to be generated is performed by using the class taps. Furthermore, as prediction taps, a plurality of predetermined pixels of the second image is extracted from the second image. The plurality of predetermined pixels includes the subject pixel and is used for prediction of the pixel to be generated. Furthermore, a pixel value of a pixel corresponding to the pixel to be generated is extracted from a teacher image having the same resolution as the third image. The teacher image is an image that is not corrupted by an error of a motion vector. Furthermore, prediction coefficients for the class of the pixel to be generated are calculated by using the extracted pixel value and the prediction taps. The prediction coefficients are used to predict a pixel value of the pixel to be generated from the prediction taps.

According to a third embodiment of the present invention, there is provided an image processing apparatus. The image processing apparatus includes motion classifying means for classifying a subject pixel under consideration in a second image into one of a plurality of motion classes on the basis of a feature of motion calculated from the subject pixel, the second image being generated by a frame interpolation process, the frame interpolation process being a process of detecting a motion vector on a frame of a first image, assigning the motion vector detected to a pixel on a frame of the second image, and generating a pixel value of the pixel on the frame of the second image on the basis of the motion vector assigned; prediction-coefficient generating means for generating prediction coefficient sets individually for the plurality of motion classes, from a first prediction coefficient set, a second prediction coefficient set, and a third prediction coefficient set in accordance with a user's operation, the first prediction coefficient set including prediction coefficients obtained in advance by using pixels representing corrupted images, the second prediction coefficient set including prediction coefficients obtained in advance by using pixels representing uncorrupted images, and the third prediction coefficient set including prediction coefficients obtained in advance by using pixels representing corrupted images and pixels representing uncorrupted images; class-tap extracting means for extracting from the second image, as class taps, a plurality of predetermined pixels of the second image, the plurality of predetermined pixels including the subject pixel, and the plurality of predetermined pixels being used for waveform classification of a pixel to be generated of a third image into one of a plurality of waveform classes, the third image having a higher resolution than the second image, and the pixel to be generated being located at a position corresponding to the subject pixel of the second image; waveform classifying means for performing waveform classification of the pixel to be generated by using the class taps; prediction-tap extracting means for extracting from the second image, as prediction taps, a plurality of predetermined pixels of the second image, the plurality of predetermined pixels including the subject pixel and being used for prediction of the pixel to be generated; and predictive calculating means for generating the third image by predictively calculating a pixel value of the pixel to be generated by using the prediction taps and using prediction coefficients for a waveform class of the pixel to be generated determined by the waveform classifying means among the prediction coefficient set generated by the prediction-coefficient generating means for the motion class of the subject pixel.

The motion classifying means may calculate a value representing variation between the motion vector assigned to the subject pixel of the second image and motion vectors assigned to neighboring pixels in a predetermined neighboring range of the subject pixel, and classify the subject pixel into one of the plurality of motion classes on the basis of the value representing variation between these motion vectors.

Furthermore, according to the third embodiment of the present invention, there is provided an image processing method or program. The image processing method or program includes the steps of classifying a subject pixel under consideration in a second image into one of a plurality of motion classes on the basis of a feature of motion calculated from the subject pixel, the second image being generated by a frame interpolation process, the frame interpolation process being a process of detecting a motion vector on a frame of a first image, assigning the motion vector detected to a pixel on a frame of the second image, and generating a pixel value of the pixel on the frame of the second image on the basis of the motion vector assigned; generating prediction coefficient sets individually for the plurality of motion classes, from a first prediction coefficient set, a second prediction coefficient set, and a third prediction coefficient set in accordance with a user's operation, the first prediction coefficient set including prediction coefficients obtained in advance by using pixels representing corrupted images, the second prediction coefficient set including prediction coefficients obtained in advance by using pixels representing uncorrupted images, and the third prediction coefficient set including prediction coefficients obtained in advance by using pixels representing corrupted images and pixels representing uncorrupted images; extracting from the second image, as class taps, a plurality of predetermined pixels of the second image, the plurality of predetermined pixels including the subject pixel, and the plurality of predetermined pixels being used for waveform classification of a pixel to be generated of a third image into one of a plurality of waveform classes, the third image having a higher resolution than the second image, and the pixel to be generated being located at a position corresponding to the subject pixel of the second image; performing waveform classification of the pixel to be generated by using the class taps; extracting from the second image, as prediction taps, a plurality of predetermined pixels of the second image, the plurality of predetermined pixels including the subject pixel and being used for prediction of the pixel to be generated; and generating the third image by predictively calculating a pixel value of the pixel to be generated by using the prediction taps and using prediction coefficients for a waveform class of the pixel to be generated among the prediction coefficient set generated for the motion class of the subject pixel.

In the image processing method, image processing method or program according to the third embodiment of the present invention, a subject pixel under consideration in a second image is classified into one of a plurality of motion classes on the basis of a feature of motion calculated from the subject pixel. The second image is generated by a frame interpolation process, which is a process of detecting a motion vector on a frame of a first image, assigning the motion vector detected to a pixel on a frame of the second image, and generating a pixel value of the pixel on the frame of the second image on the basis of the motion vector assigned. Furthermore, prediction coefficient sets are generated individually for the plurality of motion classes, from a first prediction coefficient set, a second prediction coefficient set, and a third prediction coefficient set in accordance with a user's operation. The first prediction coefficient set includes prediction coefficients obtained in advance by using pixels representing corrupted images. The second prediction coefficient set includes prediction coefficients obtained in advance by using pixels representing uncorrupted images. The third prediction coefficient set includes prediction coefficients obtained in advance by using pixels representing corrupted images and pixels representing uncorrupted images. Furthermore, as class taps, a plurality of predetermined pixels of the second image are extracted from the second image. The plurality of predetermined pixels includes the subject pixel, and is used for waveform classification of a pixel to be generated of a third image into one of a plurality of waveform classes. The third image has a higher resolution than the second image. The pixel to be generated is located at a position corresponding to the subject pixel of the second image. Furthermore, waveform classification of the pixel to be generated is performed by using the class taps. Furthermore, as prediction taps, a plurality of predetermined pixels of the second image are extracted from the second image. The plurality of predetermined pixels includes the subject pixel and is used for prediction of the pixel to be generated. Furthermore, the third image is generated by predictively calculating a pixel value of the pixel to be generated by using the prediction taps and using prediction coefficients for the waveform class of the pixel to be generated among the prediction coefficient set generated for the motion class of the subject pixel.

According to these embodiments of the present invention, it is possible to make corruption of a generated image less apparent and to enhance resolution.

BRIEF DESCRIPTION OF THE DRAWINGS

FIG. 33 is a diagram showing an example of coefficient seeds;

DESCRIPTION OF THE PREFERRED EMBODIMENTS

Now, embodiments of the present invention will be described with reference to the drawings.

Figure 3:
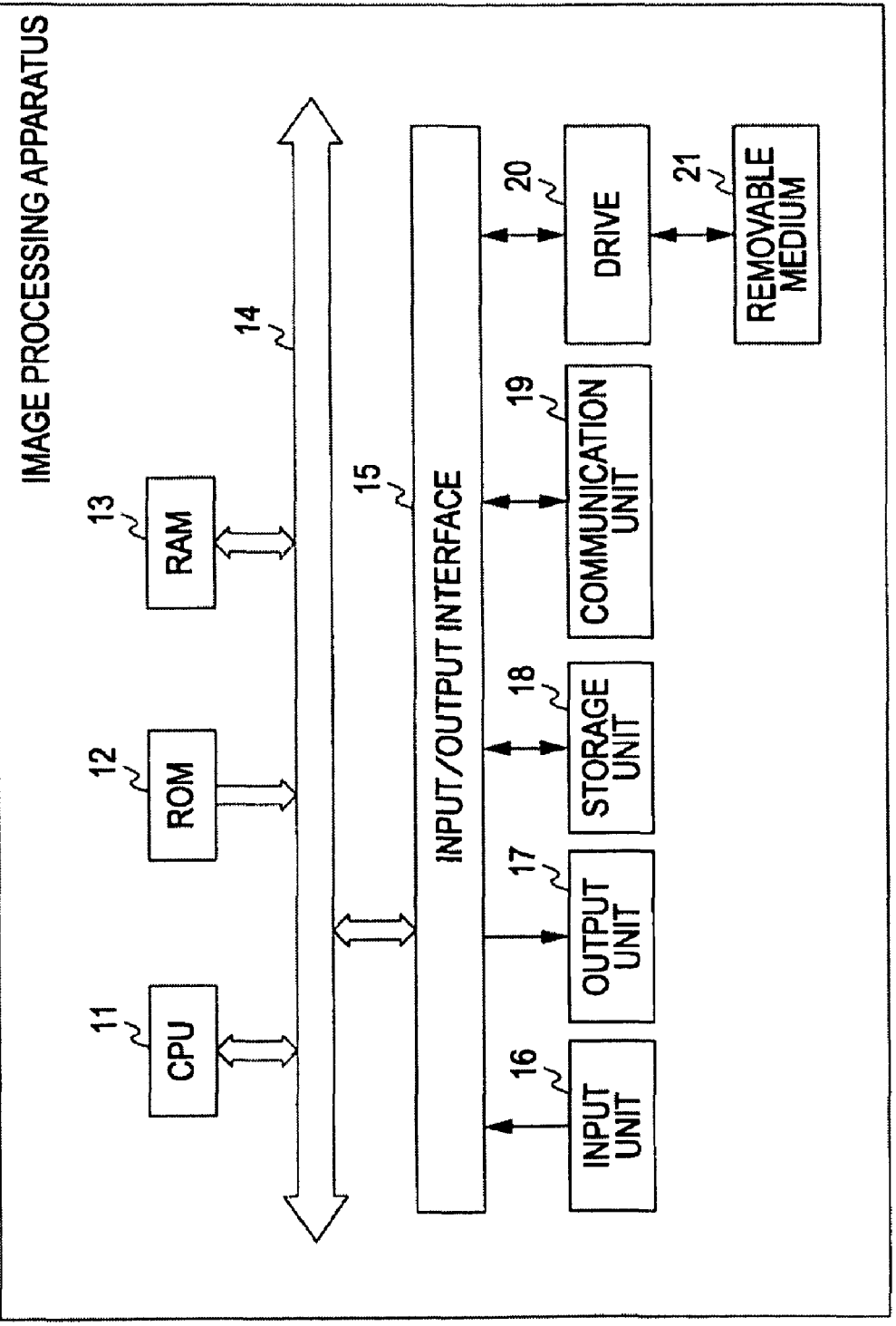
FIG. 3 is a block diagram showing an example configuration of an image processing apparatus according to an embodiment of the present invention.

FIG. 3 shows an example configuration of an image processing apparatus 1 according to an embodiment of the present invention. The image processing apparatus 1 is implemented, for example, by a personal computer. Referring to FIG. 3, a central processing unit (CPU) 11 executes various types of processing according to programs stored in a read-only memory (ROM) 12 or a storage unit 18. A random access memory (RAM) 13 stores programs executed by the CPU 11, data, and so forth as appropriate. The CPU 11, the ROM 12, and the RAM 13 are connected to each other via a bus 14.

Furthermore, the CPU 11 is connected to an input/output interface 15 via the bus 14. The input/output interface 15 is connected to an input unit 16 having a keyboard, a mouse, a microphone, and so forth, and an output unit 17 having a display, a speaker, and so forth. The CPU 11 executes various types of processing according to instructions input from the input unit 16. Then, the CPU 11 outputs image, sound, and so forth obtained as results of the processing to the output unit 17.

A storage unit 18 connected to the input/output interface 15 is implemented, for example, by a hard disk. The storage unit 18 stores programs executed by the CPU 11 and various types of data. A communication unit 19 performs communication with external apparatuses via the Internet or other networks.

Furthermore, programs may be obtained via the communication unit 19 and stored in the storage unit 18.

A drive 20 connected to the input/output interface 15 drives a removable medium 21 mounted thereon, such as a magnetic disk, an optical disc, a magneto-optical disk, or a semiconductor memory, to obtain a program, data, or the like recorded thereon. The program or data obtained is transferred to and stored in the storage unit 18 as appropriate.

The image processing apparatus 1 may be, for example, a television receiver, a hard disk player, an optical disc player, or a portable player (cellular phone), or an image processing unit thereof.

Figure 4:
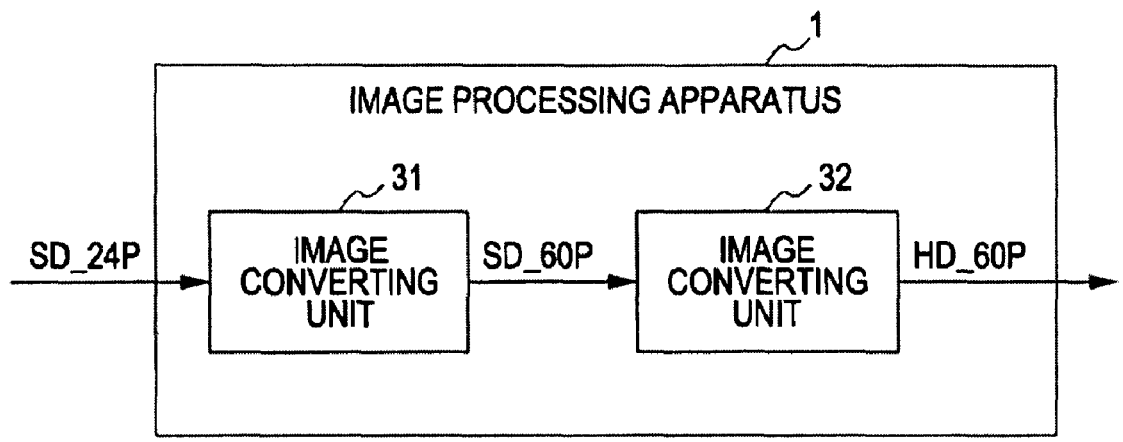
FIG. 4 is a block diagram showing an example functional configuration of the image processing apparatus.

FIG. 4 is a block diagram showing an example configuration of the image processing apparatus 1. The image processing apparatus 1 includes image converting units 31 and 32.

The functions of the image processing apparatus 1 may be implemented either in hardware or in software. That is, block diagrams in this specification may be considered either as hardware block diagrams or software functional block diagrams.

Figure 1:
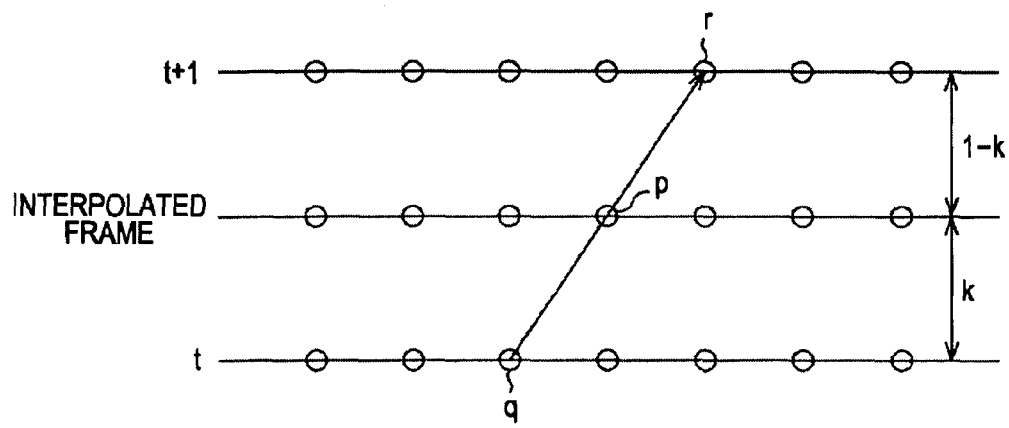
FIG. 1 is a diagram for explaining a frame interpolation process.

The image processing apparatus 1 shown in FIG. 1 receives image signals of a standard definition (SD) progressive image with a frame frequency of 24 Hz (hereinafter referred to as SD_24P signals).

The image converting unit 31 receives the SD_24P signals supplied to the image processing apparatus 1. The image converting unit 31 converts the frame rate by performing a frame interpolation process based on motion vectors on the SD_24P signals input thereto, thereby generating image signals of an SD progressive image with a frame frequency of 60 Hz (hereinafter referred to as SD_60P signals), and supplies the SD_60P signals to the image converting unit 32.

The image converting unit 32 performs a classification and adaptation process described later on the SD_60P signals supplied from the image converting unit 31, thereby generating image signals of a high definition (HD) progressive image with a frame frequency of 60 Hz (hereinafter referred to as HD_60P signals), which has a higher resolution, and outputs the HD_60P signals to the outside.

Figure 2:
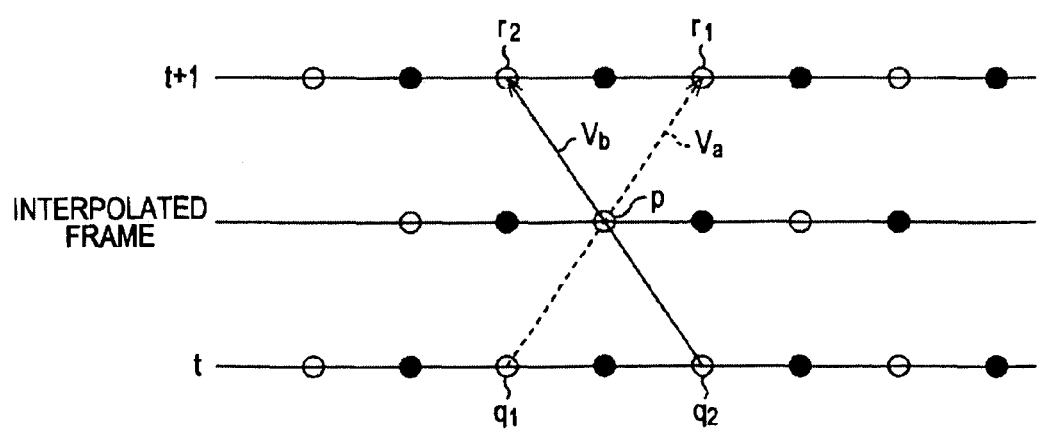
FIG. 2 is a diagram for explaining corruption of an image.

Since the SD_60P signals supplied from the image converting unit 31 are obtained by performing a frame interpolation process on SD_24P signals, there exists a possibility that an image corruption due to error in assigned motion vectors has occurred, for example, as shown in FIG. 2. Thus, as a post-process for the SD_60P signals generated by the frame interpolation process, the image converting unit 32 alleviates corruption of the image due to error in assigned motion vectors, thereby generating an image composed of HD_60P signals, having a higher resolution than the image composed of SD_60P signals.

Figure 5:
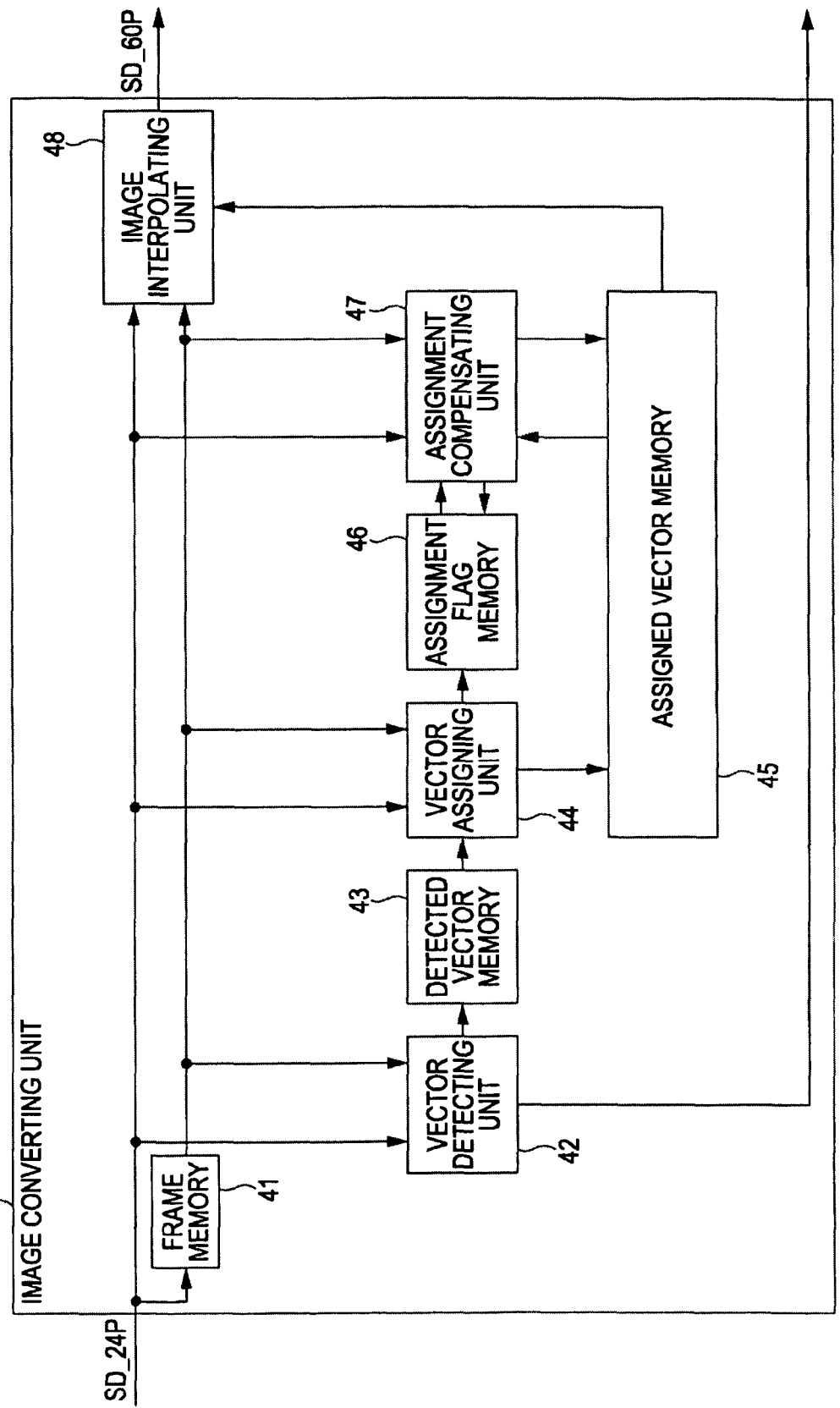
FIG. 5 is a block diagram showing an example configuration of a first image converting unit shown in FIG. 4.

FIG. 5 shows an example configuration of the image converting unit 31. The image converting unit 31 includes a frame memory 41, a vector detecting unit 42, a detected vector memory 43, a vector assigning unit 44, an assigned vector memory 45, an assignment flag memory 46, an assignment compensating unit 47, and an image interpolating unit 48.

The frame memory 41 receives SD_24P signals. The frame memory 41 stores SD_24P signals input thereto on a frame-by-frame basis. The frame memory 41 stores a frame t at time t, which is one period before a frame t+1 at time t+1. The frame t at time t, stored in the frame memory 41, is supplied to the vector detecting unit 42, the vector assigning unit 44, the assignment compensating unit 47, and the image interpolating unit 48.

The vector detecting unit 42 receives the frame t at time t, stored in the frame memory 41, and the next frame t+1.

The vector detecting unit 42 detects a motion vector between a reference block of the frame t on the frame memory 41 and a subject block of the frame t+1, and stores the motion vector detected in the detected vector memory 43. As a method of detecting a motion vector between two frames, the gradient method can be used.

More specifically, when calculating a motion vector at a pixel in the frame t, for each pixel in a surrounding region (e.g., 8×8 pixels) of the pixel, the vector detecting unit 42 calculates differences between the luminance of the pixel and the luminances of individual adjacent pixels in the x and y directions of the pixel (e.g., spatial gradients) and differences between the luminance of the pixel and the luminance of in-phase pixels in the frame t+1 (i.e., temporal gradients). Then, the vector detecting unit 42 performs calculation according to a predetermined equation by using these differences, thereby obtaining a motion vector for the pixel in the frame t. A method of calculating a motion vector based on spatial and temporal gradients is described in detail, for example, in Japanese Unexamined Patent Application Publication No. 2007-74587.

The vector detecting unit 42 supplies the temporal and spatial gradients (hereinafter referred to as gradient information where distinction is not necessary) used to detect a motion vector to the image converting unit 32.

The detected vector memory 43 stores the motion vector detected on the frame t by the vector detecting unit 42.

The vector assigning unit 44 assigns the motion vector calculated on the frame t of the SD_24P signals to a pixel on an interpolated frame of SD_60P signals on the assigned vector memory 45 (hereinafter, a frame of SD_60P signals will also be referred to as an interpolated frame for distinction from a frame of SD_24P signals), and rewrites an assignment flag in the assignment flag memory 46, corresponding to the pixel to which the motion vector has been assigned, to 1 (True).

The assigned vector memory 45 stores motion vectors assigned by the vector assigning unit 44 in association with individual pixels of an interpolated frame.

The assignment flag memory 46 stores, for each pixel of an interpolated frame, an assignment flag indicating the presence or absence of a motion vector assigned thereto. For example, an assignment flag with a value True (1) indicates that a motion vector has been assigned to the corresponding pixel. On the other hand, an assignment flag with a value False (0) indicates that no motion vector has been assigned to the corresponding pixel.

The assignment compensating unit 47 refers to the assignment flags in the assignment flag memory 46, and for each pixel for which no motion vector has been assigned by the vector assigning unit 44, performs compensation by using motion vectors of neighboring pixels of the pixel, and assigns a resulting motion vector to the interpolated frame in the assigned vector memory 45. At this time, the assignment compensating unit 47 rewrites the assignment flag corresponding to the pixel to which the motion vector has been assigned to 1 (True).

The image interpolating unit 48 performs interpolation to generate pixel values of the interpolated frame in the assigned vector memory 45 by using the motion vectors assigned to the interpolated frame and the pixel values of the frame t and the next frame t+1. Then, the image interpolating unit 48 outputs the interpolated frame generated to the image converting unit 32. Then, the image interpolating unit 48 outputs the frame t+1 to the image converting unit 32 as appropriate. That is, the image interpolating unit 48 outputs SD_60P signals.

Now, an overview of the frame interpolation process by the image converting unit 31 will be described with reference to FIGS. 6 and 7. In an example shown in FIG. 6, dotted lines indicate frames of SD_24P signals input to the image converting unit 31 at time t, t+1, and t+2, and solid lines indicate interpolated frames of SD_60P signals at time t, t+0.4, t+0.8, t+1.2, t+1.6, and t+2, generated by the image converting unit 31 from the input SD_24P signals.

Generally, in order to convert SD_24P signals into SD_60P signals, the number of frames should be increased by 5/2 times. That is, from two frames of SD_24P signals, five frames of SD_60P signals should be generated. At this time, in order that the frame intervals of the interpolated frames of SD_60P signals be equal, the interpolated frames of SD_60P signals are arranged so that their temporal phases on the SD_24P signals are 0.0, 0.4, 0.8, 1.2, and 1.6. Among these frames, the four frames (frames at t+0.4, t+0.8, t+1.2, and t+1.6), other than the frame at 0.0, represent images that do not exist on the SD_24P signals.

Thus, upon receiving an image of SD_24 signals, the image converting unit 31 generates four interpolated frames from two frames of the SD_24P signals at time t and time t+1. Thus, an image of SD_60P signals composed of five frames at time t, t+0.4, t+0.8, t+1.2, and t+1.6 is output from the image converting unit 31.

In the manner described above, the image converting unit 31 executes a process of converting the frame frequency from an image of SD_24P signals to an image of SD_60P signals.

In principle, as described above, five frames of SD_60P signals at time t, t+0.4, t+0.8, t+1.2, and t+1.6 are newly generated from two frames of SD_24P signals at time t and t+1. Actually, however, in the example shown in FIG. 6, frames of SD_60P signals at time t, t+0.4, and t+0.8 are generated on the basis of two frames of SD_24P signals at time t and t+1, and frames of SD_60P signals at time t+1.2, t+1.6, and t+2 are generated on the basis of two frames of SD_24P signals at time t+1 and t+2.

Hereinafter, interpolated frames at time t+k, such as interpolated frames at time t+0.4, t+0.8, t+1.2, and t+1.6, will be referred to as interpolated frames t+k.

Figure 7:
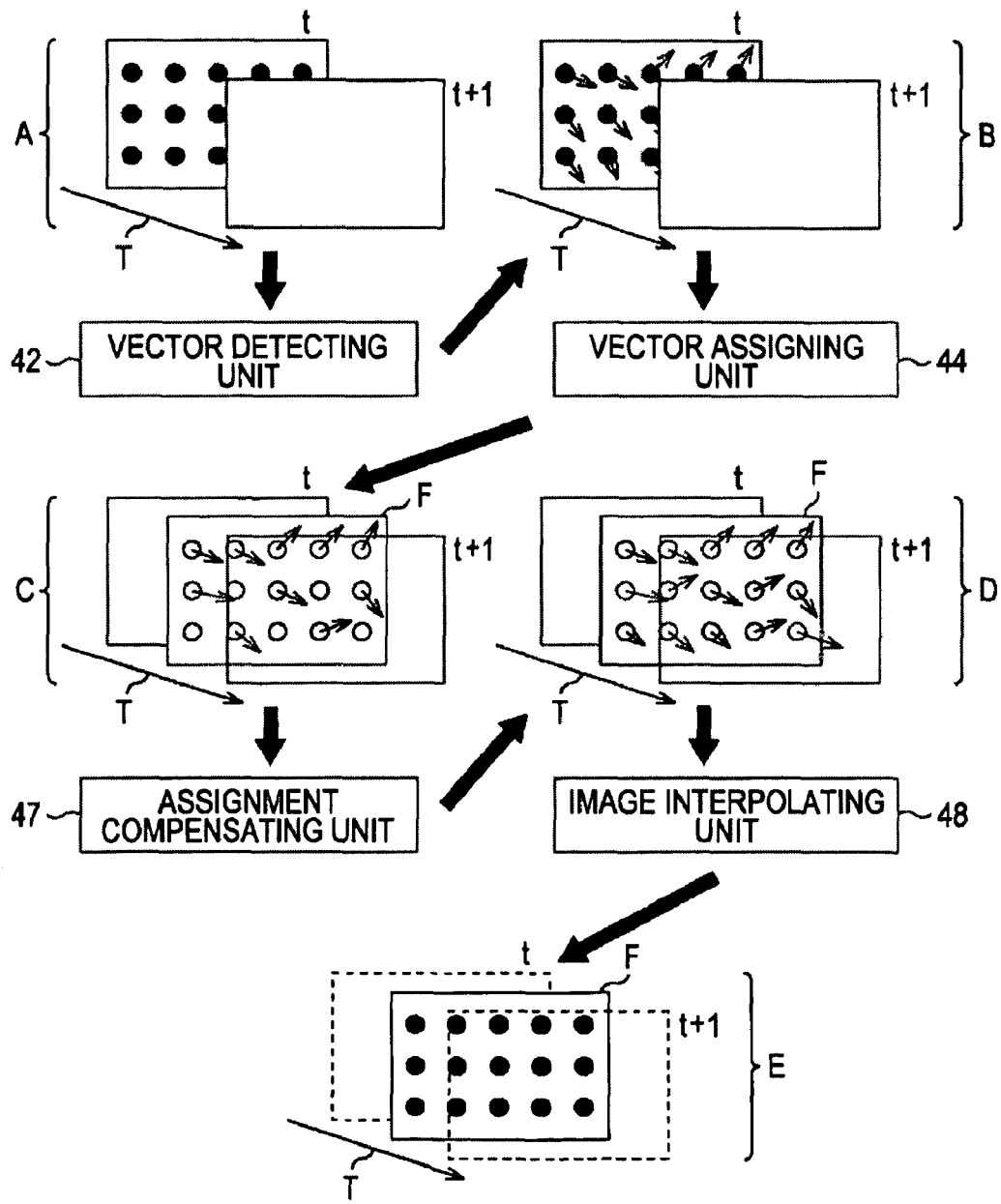
FIG. 7 is a diagram for explaining the frame interpolation process more specifically.

FIG. 7 shows an example of transition of data in individual parts of the image converting unit 31. In the example shown in FIG. 7, thick arrows indicate transitions to individual states, and arrows T indicate the direction of elapse of time through states A to E. The states A to E schematically represent the states of the frame t at time t and the next frame t+1 at time t+1 of SD_24P signals or interpolated frames F of SD_60P signals generated between the frames t and t+1 at input or output to the individual parts of the image converting unit 31. Actually, for example, a frame for which motion vectors have been detected as represented by the state B is not input, and a frame and motion vectors are input separately.

The state A represents the state of the frames t and t+1 of SD_24P signals input to the vector detecting unit 42. Black dots on the frame t in the state A represent pixels on the frame t.

For each pixel in the frame t in the state A, the vector detecting unit 42 detects which pixel in the next frame t+1 the pixel moves, and outputs the motion in the form of a motion vector associated with the pixel, as indicated in the frame t in the state B. At this time, for example, if a plurality of motion vectors are detected for a pixel, the vector detecting unit 42 calculates evaluation values for the individual motion vectors, and selects one of the motion vectors on the basis of the evaluation values.

The state B represents the state of the frames t and t+1 input to the vector assigning unit 44. In the state B, arrows at the individual pixels of the frame t represent motion vectors detected by the vector detecting unit 42.

Figure 6:
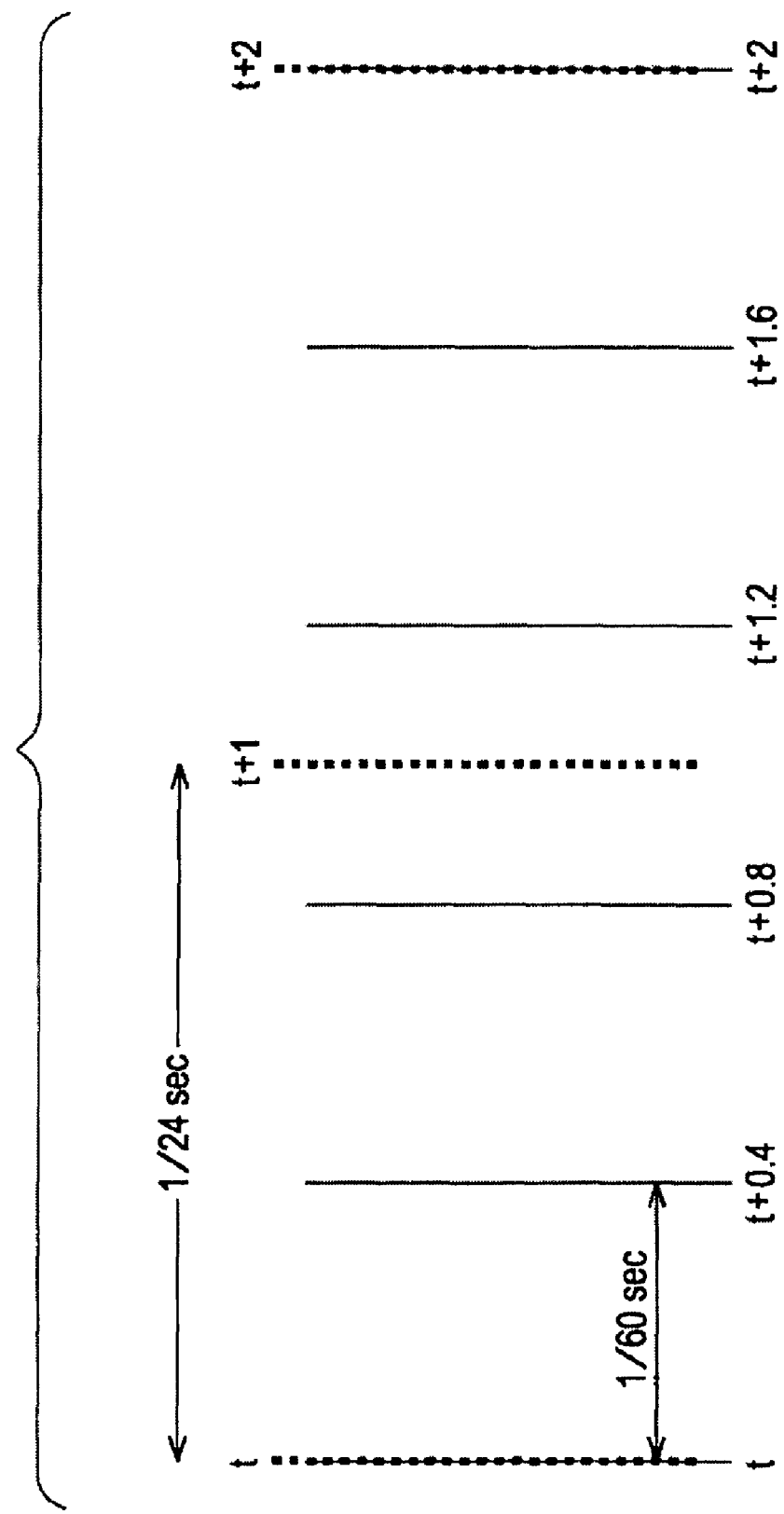
FIG. 6 is a diagram for explaining the principle of the frame interpolation process.

For each pixel in the frame t in the state B, the vector assigning unit 44 extends the motion vector detected for the pixel up to the next frame t+1, and determines a point where the motion vector passes through an interpolated frame F at a predetermined temporal phase (e.g., t+0.4 in FIG. 6). This is because, assuming that motion is constant between the frame t and the frame t+1, the point where the motion vector passes through the interpolated frame F corresponds to the position of the pixel in the frame. Thus, the vector assigning unit 44 assigns the motion vector to neighboring four pixels on the interpolated frame F in the state C. At this time, depending on the pixels of the interpolated frame, there can be cases where no motion vector is assigned to a pixel or a plurality of motion vectors become candidates of a motion vector to be assigned to a pixel. In the latter case, for example, similarly to the vector detecting unit 42, the vector assigning unit 44 calculates evaluation values for the individual motion vectors, and selects one of the motion vectors to be assigned on the basis of the evaluation values.

The state C represents the state of the frames t and t+1 and the interpolated frame F to which motion vectors have been assigned, input to the assignment compensating unit 47. In the interpolated frame F in the state C, pixels to which motion vectors have been assigned by the vector assigning unit 44 and pixels to which motion vectors have not been assigned by the vector assigning unit 44 are shown.

The assignment compensating unit 47 performs compensation for each pixel for which no motion vector has been assigned in the state C by using motion vectors assigned to neighboring pixels of the pixel. This is because, assuming that a subject pixel and its neighboring region exhibit the same motion, the motion vector of the subject pixel is supposed to be similar to the motion vectors of the neighboring pixels. Thus, a motion vector with a certain degree of accuracy is assigned to a pixel to which no motion vector has been assigned, so that motion vectors are assigned to all the pixels on the interpolated frame F in the state D. Also in this case, since motion vectors of a plurality of neighboring pixels exist as candidates, for example, similarly to the vector assigning unit 44, the assignment compensating unit 47 calculates evaluation values for the individual motion vectors, and selects one of the motion vectors to be assigned on the basis of the evaluation values.

The state D represents the state of the frame t and frame t+1 and the interpolated frame F with motion vectors assigned to all the pixels, input to the image interpolating unit 48. On the basis of the motion vectors assigned to all the pixels, the image interpolating unit 48 can determine the relationship of positions between the pixels on the interpolated frame F and the pixels on the two frames t and t+1. Thus, the image interpolating unit 48 generates values of pixels on the interpolated frame F by interpolation, as indicated by black dots on the interpolated frame F in the state E, by using the motion vectors assigned on the interpolated frame F and the pixel values of the frames t and t+1. Then, the image interpolating unit 48 outputs the interpolated frame generated, and outputs the frame t+1 as appropriate, thereby outputting an interpolated image of SD_60P signals to a subsequent stage.

Next, an example configuration of the image converting unit 32 will be described.

Figure 8:
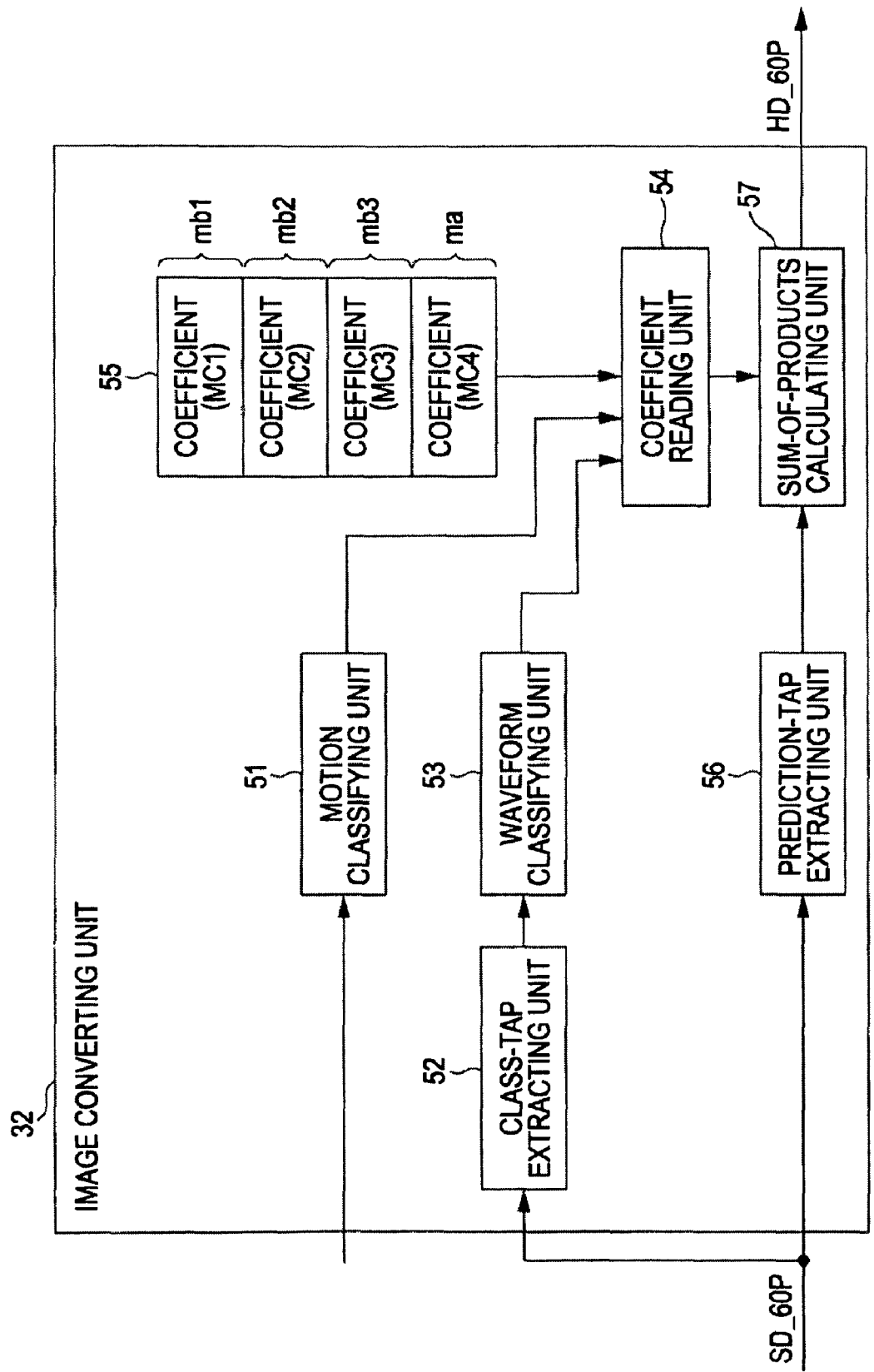
FIG. 8 is a block diagram showing an example configuration of a second image converting unit shown in FIG. 4.

FIG. 8 shows an example configuration of the image converting unit 32. The image converting unit 32 includes a motion classifying unit 51, a class-tap extracting unit 52, a waveform classifying unit 53, a coefficient reading unit 54, a coefficient memory 55, a prediction-tap extracting unit 56, and a sum-of-products calculating unit 57.

The motion classifying unit 51 receives temporal and spatial gradients supplied from (the vector detecting unit 42 of) the image converting unit 31.

The motion classifying unit 51 performs classification of motion regarding a subject pixel currently under consideration on an interpolated frame on the basis of the values of the input temporal and spatial gradients.

Figure 9:
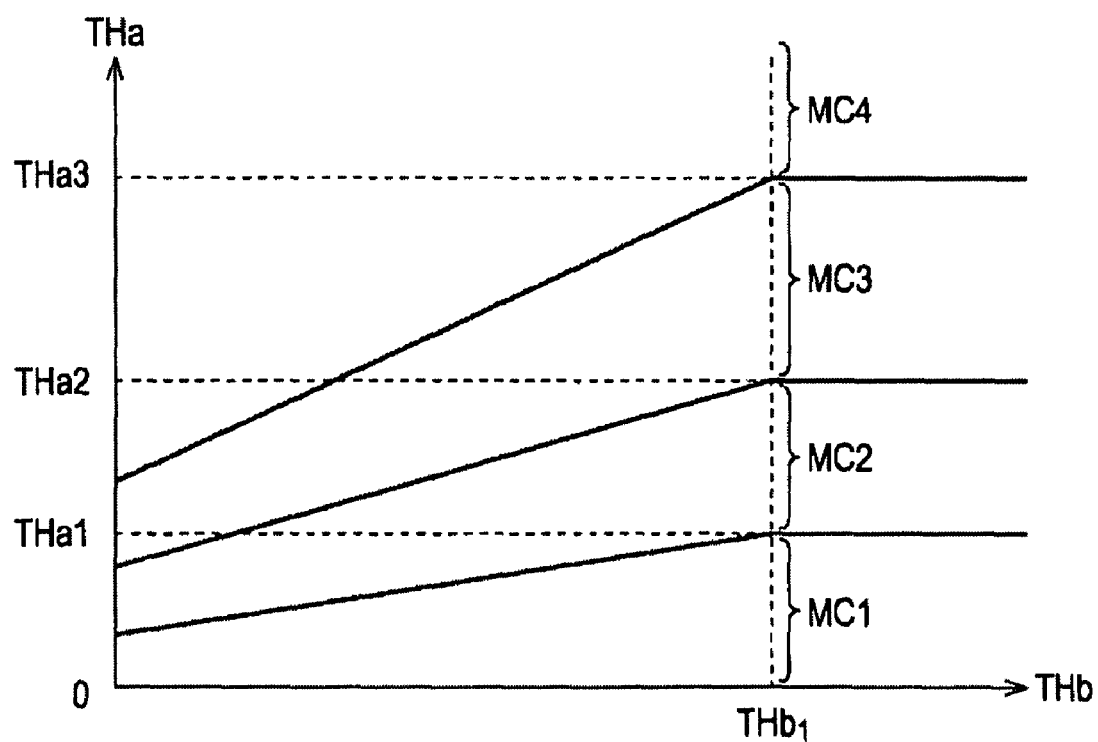
FIG. 9 is a diagram showing an example of motion classification.

More specifically, as shown in FIG. 9, if the value of a temporal gradient THa at a value THb1 of a spatial gradient THb is less than a value THa1, the motion regarding the subject pixel is classified into a motion class MC1, if the value of the temporal gradient THa is greater than or equal to the value THa1 and less than a value THa2, the motion regarding the subject pixel is classified into a motion class MC2, if the value of the temporal gradient THa is greater than or equal to the value THa2 and less than a value THa3, the motion regarding the subject pixel is classified into a motion class MC3, and if the value of the temporal gradient THa is greater than or equal to the value THa3, the motion regarding the subject pixel is classified into a motion class MC4.

The motion classifying unit 51 supplies a class number corresponding to the class determined by the classification to the coefficient reading unit 54.

The class-tap extracting unit 52 receives SD_60P signals supplied from (the image interpolating unit 48 of) the image converting unit 31.

The class-tap extracting unit 52 extracts some pixels associated with a subject pixel currently under consideration on an input frame of SD_60P signals, as class taps used for classification of an image of HD_60P signals to be generated, and supplies the class taps extracted to the waveform classifying unit 53.

The waveform classifying unit 53 performs adaptive dynamic range coding (ADRC) on the class taps supplied from the class-tap extracting unit 52. For example, the waveform classifying unit 53 performs 1-bit ADRC on the class taps. More specifically, the waveform classifying unit 53 detects a maximum value MAX and a minimum value MIN among the pixel values of the pixels constituting the class taps, and uses a difference DR between the maximum value MAX and the minimum value MIN (DR=MAX−MIN) as a local dynamic range of the set of pixels constituting the class taps. On the basis of the dynamic range DR, the waveform classifying unit 53 requantizes the pixel values of the pixels constituting the class taps into one bit. That is, the waveform classifying unit 53 subtracts the minimum value MIN from the pixel values of the individual pixels constituting the class taps, and divides (quantizes) the results of subtraction by DR/2.

Then, the waveform classifying unit 53 supplies a bit sequence in which the 1-bit pixel values of the individual pixels constituting the class taps, obtained in the manner described above, are arranged in a predetermined order to the coefficient reading unit 54 as a waveform class number.

The coefficient reading unit 54 determines, on the basis of the motion class number supplied from the motion classifying unit 51, whether an image represented by the subject pixel is corrupted. Then, the coefficient reading unit 54 refers to a memory area of the coefficient memory 55 in accordance with the result of the determination, reads prediction coefficients stored therein and associated with the waveform class number supplied from the waveform classifying unit 53, and supplies the prediction coefficients to the sum-of-products calculating unit 57.

For example, in a case where the subject pixel is a pixel on an interpolated frame, the coefficient reading unit 54 refers to a memory area of the coefficient memory 55 corresponding to the motion class number supplied from the motion classifying unit 51, reads prediction coefficients stored therein and associated with the waveform class number supplied from the waveform classifying unit 53, and supplies the prediction coefficients to the sum-of-products calculating unit 57.

In the case of the example shown in FIG. 9, if the motion class number supplied from the motion classifying unit 51 is a number representing the motion class MC4, i.e., when motion is large, the coefficient reading unit 54 assumes that the image represented by the subject pixel is corrupted (such a pixel will be referred to as a corrupted pixel). Then, the coefficient reading unit 54 refers to a memory area ma of the coefficient memory 55 and reads prediction coefficients stored in the memory area ma.

If the motion class number supplied from the motion classifying unit 51 represents one of the motion classes MC1 to MC3, the coefficient reading unit 54 assumes that the image represented by the subject pixel is not corrupted (such a pixel will be referred to as a correct pixel). Then, the coefficient reading unit 54 refers to the corresponding one of the memory areas mb1 to mb3 of the coefficient memory 55 and reads prediction coefficients stored therein.

Empirically, corruption (degradation) of an image that occurs when an interpolated frame is generated tends to occur in regions with large motion. Thus, it is possible to determine whether an image is corrupted on the basis of the motion class.

When the subject pixel is a pixel on a frame (the frame t+1 of SD_24P signals) other than the interpolated frame, the coefficient reading unit 54 refers to the memory area mb1 of the coefficient memory 55, reads prediction coefficients stored therein and associated with the waveform class number supplied from the waveform classifying unit 53, and supplies the prediction coefficients to the sum-of-products calculating unit 57.

The coefficient memory 55 have memory areas individually corresponding to motion class numbers that can be supplied from the motion classifying unit 51 (i.e., corresponding to motion classes). Each of the memory areas stores prediction coefficients calculated in advance for the corresponding waveform class. For example, the prediction coefficients are generated by a learning apparatus 101 (FIG. 10), which will be described later, and supplied to and stored in the coefficient memory 55.

The prediction-tap extracting unit 56 receives SD_60P signals from the image converting unit 31. The prediction-tap extracting unit 56 extracts some pixels associated with the subject pixel on the frame of the input SD_60P signals as prediction taps used for prediction of the pixel value of a pixel to be generated. The prediction-tap extracting unit 56 supplies the prediction taps extracted to the sum-of-products calculating unit 57.

The sum-of-products calculating unit 57 predictively calculates pixel values by multiplying the prediction taps supplied from the prediction-tap extracting unit 56, i.e., the pixel values of the pixels constituting the prediction taps, by the prediction coefficients supplied from the coefficient reading unit 54. The sum-of-products calculating unit 57 outputs the predicted pixel values to the outside, for example, on a frame-by-frame basis (i.e., outputs frames of HD_60P signals).

Next, a general scheme of predictive calculation by the sum-of-products calculating unit 57 and learning of prediction coefficients stored in the coefficient memory 55 will be described.

As a classification and adaptation process, for example, a case will be considered where prediction taps are extracted from image data of an input image (an image of SD_60P signals in the case of the example shown in FIG. 8), and pixel values of pixels of a frame of HD_60P signals are calculated (predicted) by predetermined predictive calculation by using the prediction taps and the prediction coefficients.

For example, when linear first-order predictive calculation is employed as the predetermined predictive calculation, a pixel value y of a pixel to be generated can be calculated according to a linear first-order equation expressed in equation (2) below:

$$y = \sum_{i=1}^{N} w_i x_i \tag{2}$$

In equation (2), $x_i$ denotes the pixel value of an i-th pixel of input image data constituting prediction taps for the pixel value y of the pixel to be generated, and $w_i$ denotes an i-th prediction coefficient that is multiplied with the predictive component $x_i$. In equation (2), it is assumed that the prediction taps are composed of N pixels $x_1, x_2, \ldots, x_N$.

Instead of the linear first-order equation expressed in equation (2), the pixel value y of a pixel to be generated may be calculated according to an equation of a second or higher-order linear function. Furthermore, without limitation to linear functions, the pixel value of a pixel to be generated may be calculated according to a non-linear function.

Now, let the true value of the pixel value of a pixel to be generated of an s-th sample be denoted by $y_s$, and a predictive value of the true value $y_s'$, calculated according to equation (2), be denoted by $y_s'$. Then, a prediction error $e_s$ between the true value $y_s$ and the predictive value $y_s'$ can be expressed by equation (3) below:

$$e_s = (y_s - y_s')$$

Since the predictive value $y_s'$ in equation (3) is calculated according to equation (2), substitution for $y_s'$ in equation (3) according to equation (2) yields equation (4) below:

$$e_s = \left( y_s - \left( \sum_{i=1}^{N} w_i x_{s,i} \right) \right) \tag{4}$$

In equation (4), $x_{s,i}$ denotes the pixel value of an i-th pixel constituting prediction taps for the pixel to be generated of the s-th sample.

A prediction coefficient $w_i$ that makes the prediction error $e_s$ in equation (4) (or equation (3)) zero is optimal for predicting the pixel value of the pixel to be generated. However, generally, it is difficult to obtain such a prediction coefficient $w_i$ for all the pixels to be generated.

Thus, for example, by employing the least square method as a criterion for determining optimality of a prediction coefficient $w_i$, it is possible to determine an optimal prediction coefficient $w_i$ by minimizing the sum E of square errors, expressed by equation (5) below:

$$E = \sum_{s=1}^{S} \left( y_s - \sum_{i=1}^{N} w_i x_{s,i} \right)^2 \qquad (5)$$

In equation (5), S denotes the number of samples (learning samples) of sets of the pixel $y_s$ to be generated and pixels $x_{s,1}$, $x_{x,2}, \ldots, X_{s,N}$ constituting prediction taps for the pixel $y_s$ to be generated.

The minimum value of the sum E of square errors in equation (5) is given by $w_i$ with which partial differentiation of the sum E by the prediction coefficient $w_i$ becomes zero, as expressed in equation (6) below:

$$\frac{\partial E}{\partial w_i} = 2e_1 \frac{\partial e_1}{\partial w_i} + 2e_2 \frac{\partial e_2}{\partial w_i} + \ldots + 2e_s \frac{\partial e_s}{\partial w_i} = 0 \ (i = 1, 2, \ldots, N) \qquad (6)$$

Partial differentiation of equation (4) given earlier with the prediction coefficient $w_i$ yields equation (7) below:

$$\frac{\partial e_s}{\partial w_1} = -x_{s,1}, \frac{\partial e_s}{\partial w_2} = -x_{s,2}, \ldots, \frac{\partial e_s}{\partial w_N} = -x_{s,N}, (s = 1, 2, \ldots, S) \qquad (7)$$

From equations (6) and (7), equation (8) below is derived:

$$\sum_{s=1}^{S} e_s x_{s,1} = 0, \sum_{s=1}^{S} e_s x_{s,2} = 0, \ldots \sum_{s=1}^{S} e_s x_{s,N} = 0 \qquad (8)$$

By substituting equation (4) for $e_s$ in equation (8), equation (8) can be expressed by a normal equation expressed in equation (9) below:

$$\begin{bmatrix} \left(\sum_{s=1}^{S} x_{s,1}x_{s,1}\right) & \left(\sum_{s=1}^{S} x_{s,1}x_{s,2}\right) & \cdots & \left(\sum_{s=1}^{S} x_{s,1}x_{s,N}\right) \\ \left(\sum_{s=1}^{S} x_{s,2}x_{s,1}\right) & \left(\sum_{s=1}^{S} x_{s,2}x_{s,2}\right) & \cdots & \left(\sum_{s=1}^{S} x_{s,2}x_{s,N}\right) \\ \vdots & \vdots & \ddots & \vdots \\ \left(\sum_{s=1}^{S} x_{s,N}x_{s,1}\right) & \left(\sum_{s=1}^{S} x_{s,N}x_{s,2}\right) & \cdots & \left(\sum_{s=1}^{S} x_{s,N}x_{s,N}\right) \end{bmatrix} \begin{bmatrix} w_1 \\ w_2 \\ \vdots \\ w_N \end{bmatrix} = \begin{bmatrix} \left(\sum_{s=1}^{S} x_{s,1}y_s\right) \\ \left(\sum_{s=1}^{S} x_{s,2}y_s\right) \\ \vdots \\ \left(\sum_{s=1}^{S} x_{s,N}y_s\right) \end{bmatrix} \qquad (9)$$

The normal equation in equation (9) can be solved for the prediction coefficient $w_i$, for example, by using the sweep-out method (Gauss-Jordan elimination).

By generating the normal equation in equation (9) for each class of pixel to be generated and solving the normal equation, it is possible to obtain an optimal prediction coefficient $w_i$ for each class (here, a prediction coefficient $w_i$ that minimizes the sum E of square errors).

The sum-of-products calculating unit 57 shown in FIG. 8 can generate an image of HD_60P signals from an input image (an image of SD_60P signals) by performing calculation according to equation (2) by using the prediction coefficient $w_i$ obtained for each class as described above, i.e., the prediction coefficient $w_i$ determined according to the class.

Next, with reference to FIG. 10, a learning apparatus 101 that performs learning to obtain the prediction coefficient $w_i$ for each class by generating and solving the normal equation in equation (9) will be described. The learning apparatus 101 receives image signals of an HD progressive image with a frame frequency of 120 Hz (hereinafter referred to as HD_120P signals).

A separating unit 111 receives the HD_120P signals supplied to the learning apparatus 101. The separating unit 111 separates the input HD_120P signals into image signals of an HD progressive image with a frame frequency of 24 Hz (hereinafter referred to as HD_24P signals) and image signals of a progressive HD image with a frame frequency of 60 Hz (hereinafter referred to as HD_60P signals).

Figure 11:
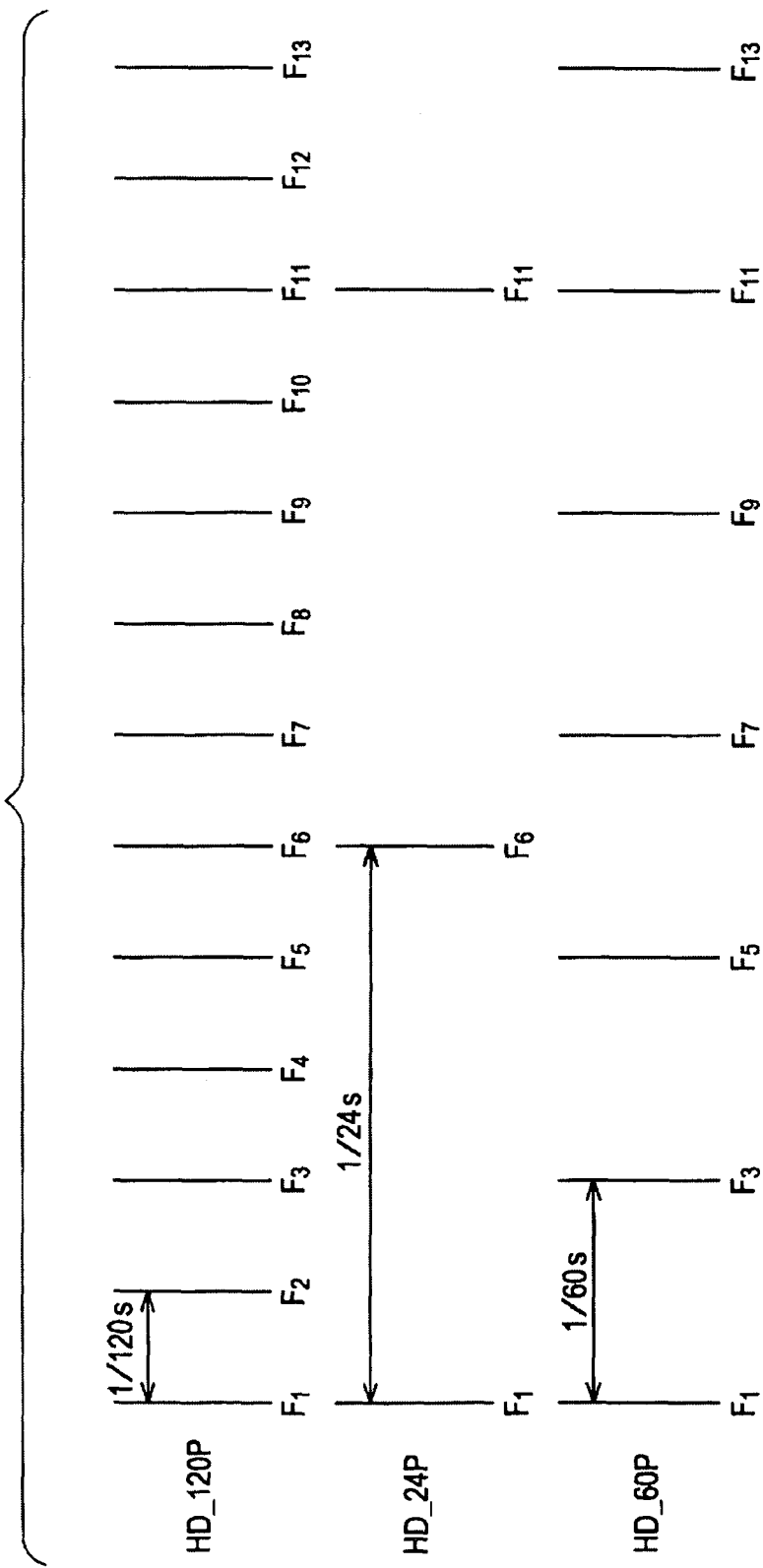
FIG. 11 is a diagram for explaining a teacher image.

For example, as shown in FIG. 11, from frames F1, F2, F3, F4, F5, F6, F7, F8, F9, F10, F11, F12, F13, ..., frames F1, F6, and F11 are obtained at intervals of 1/24 seconds, whereby an image of HD_24P signals is generated. Furthermore, from the frames of HD_120P signals, frames F1, F3, F5, F7, F9, F11, F13, ... are obtained at intervals of 1/60 seconds, whereby an image of HD_60P signals is generated.

The separating unit 111 supplies the HD_24P signals generated by the separation to a decimating unit 112, and supplies the HD_60P signals to a decimating unit 113, a learning unit 117, and a learning unit 118.

The decimating unit 112 generates SD_24P signals by decimating pixels from the frame of HD_24P signals supplied from the separating unit 111 so that the number of pixels becomes equal to the number of pixels constituting a frame of SD_24P signals, and supplies the SD_24P signals to an image converting unit 114.

The decimating unit 113 generates an image of SD_60P signals by decimating pixels from the frame of HD_60P signals supplied from the separating unit 111 so that the number of pixels becomes equal to the number of pixels constituting a frame of SD_60P signals, and supplies the image to the learning unit 118.

The image converting unit 114 is configured basically the same as the image converting unit 31 shown in FIG. 5. The image converting unit 114 performs frame interpolation on an image of SD_24P signals supplied from the decimating unit 112 to convert the image into an image of SD_60P signals, and supplies the image to the learning unit 117. Furthermore, the image converting unit 114 supplies a spatial gradient and a temporal gradient calculated at the time of vector detection to a motion classifying unit 116.

Similarly to the motion classifying unit 51 shown in FIG. 8, the motion classifying unit 116 determines a motion class number on the basis of the temporal gradient and spatial gradient supplied from the image converting unit 114, and supplies the motion class number to a learning controlling unit 119.

The learning unit 117 performs a learning process by using the image of SD_60P signals supplied from the image converting unit 114 as a student image and using the image of HD_60P signals supplied from the separating unit 111 as a teacher image. That is, since the SD_60P signals supplied from the image converting unit 114 have been generated by converting SD_24P signals by frame interpolation and thus include corrupted pixels, the learning unit 117 performs a learning process by using the corrupted pixels.

The learning unit 118 performs a learning process by using the image of SD_60P signals supplied from the decimating unit 113 as a student image and using the image of HD_60P signals supplied from the separating unit 111 as a teacher image. That is, since the image of SD_60P signals supplied from the decimating unit 113 have been generated by separation from HD_60P signals and therefore are not corrupted by frame interpolation, the learning unit 118 performs a learning process by using correct pixels (performs an ordinary learning process for enhancing resolution).

The learning controlling unit 119 controls either the learning unit 117 or the learning unit 118 according to the motion class number supplied from the motion classifying unit 116 so that the control unit 117 or 118 performs a learning process.

For example, if the motion class number supplied from the motion classifying unit 116 represents the motion class MC4 (FIG. 9), i.e., when motion is large so that the current subject pixel is determined as a corrupted pixel, the learning controlling unit 119 controls the learning unit 117 so that the learning unit 117 performs a learning process by using the corrupted pixel.

On the other hand, if the motion class number supplied from the motion classifying unit 116 represents one of the motion classes MC1 to MC3 (FIG. 9), i.e., when motion is small so that the current subject pixel is determined as a correct pixel, the learning controlling unit 119 controls the learning unit 118 so that the learning unit 118 performs a learning process by using the correct pixel (an ordinary learning process for enhancing resolution).

Figure 12:
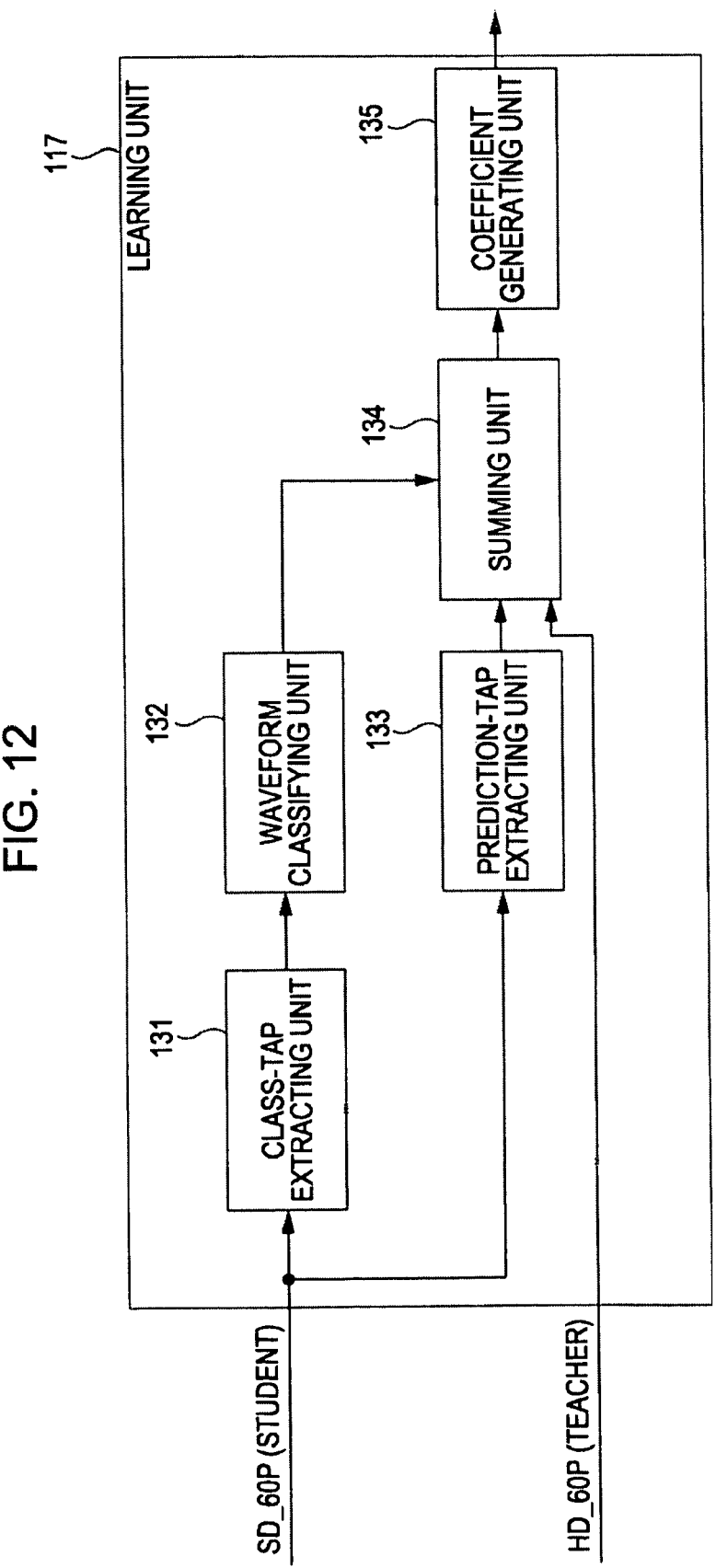
FIG. 12 is a block diagram showing an example configuration of a learning unit shown in FIG. 10.

FIG. 12 shows an example configuration of the learning unit 117.

A class-tap extracting unit 131 receives SD_60P signals from the image converting unit 114. The class-tap extracting unit 131 extracts some pixels associated with a subject pixel on a frame of the input SD_60P signals as class taps for classification of an image of HD_60P signals to be generated, and supplies the class taps extracted to a waveform classifying unit 132.

The waveform classifying unit 132 performs an ADRC process on the class taps supplied from the class-tap extracting unit 131, and supplies a waveform class number obtained as a result to a summing unit 134.

A prediction-tap extracting unit 133 receives SD_60P signals from the image converting unit 114. The prediction-tap extracting unit 133 extracts some pixels associated with a subject pixel on the frame of the input SD_60P signals as predication taps for predicting the pixel value of a pixel to be generated, and supplies the prediction taps extracted to the summing unit.

The summing unit 134 receives HD_60P signals from the separating unit 111. The summing unit 134 sequentially selects each pixel in the frame of the input HD_60P signals as a pixel to be generated, and detects the pixel value thereof. Furthermore, the summing unit 134 performs summation for the pixel to be generated and the pixels constituting prediction taps in accordance with the waveform class number supplied from the waveform classifying unit 132, while maintaining corresponding relationship between the extracted pixel to be generated and the prediction taps supplied from the prediction-tap extracting unit 133.

That is, the summing unit 134 extract a pixel value $y_s$ of the pixel to be generated. Furthermore, the summing unit 134 receives prediction taps (pixel values of pixels of the frame of SD_60P signals) $x_{s,i}$ and a waveform class number.

Then, for each class corresponding to the waveform class number, by using the prediction taps $x_{s,i}$, the summing unit 134 performs calculation corresponding to multiplication $(x_{si} \cdot x_{si})$ of input image data with each other in a matrix on the left-hand side of equation (9) and summation of the results of multiplication.

Furthermore, for each class, by using the prediction taps $x_{si}$ and image data $y_s$ of the pixel to be generated, the summing unit 134 performs multiplication $(x_{si} \cdot y_s)$ of the input image data $x_{si}$ and the generated image data $y_s$ in the vector on the right-hand side of equation (9) and summation of the results of multiplication.

That is, the summing unit 134 remembers the component $(\Sigma x_{si} \cdot x_{si})$ of the matrix on the left-hand side and the component $(\Sigma x_{si} \cdot y_s)$ of the vector on the right-hand side equation (9) obtained for image data of a previous subject pixel. The summing unit 134 performs summation expressed by $\Sigma$ in equation (9). That is, to the component $(\Sigma x_{si} \cdot x_{si})$ of the matrix or the component $(\Sigma x_{si} \cdot x_{ys})$ of the vector, the summing unit 134 sums the corresponding component $(x_{s+1,i} \cdot x_{s+1,i})$ or $(x_{s+1,i} \cdot y_{s+1})$ calculated for image data of a next pixel to be generated by using the image data $y_{s+1}$ and input image data $x_{x+1,i}$.

Then, the summing unit 134 performs the summation described above by choosing, as a pixel to be generated, each of the pixels of the frame of HD_60P signals supplied as a teacher image, thereby generating the normal equation expressed in equation (9) for each class, and supplies the normal equation to a coefficient generating unit 135.

The coefficient generating unit 135 calculates an optimal prediction coefficient $w_i$ for each class by solving the normal equation generated for the class, supplied from the summing unit 134, and outputs the prediction coefficient $w_i$.

As described above, a learning process is executed by using a corrupted pixel, and a resulting prediction coefficient is supplied to the coefficient memory 55 shown in FIG. 8 and is stored in the memory area ma thereof.

The prediction coefficients output from the coefficient generating unit 135 may be recorded on a recording medium, such as a read-only memory (ROM), and supplied from the recording medium to another apparatus.

The learning unit 118 is configured substantially the same as the learning unit 117, so that the configuration of the learning unit 118 is not shown or described in detail. The learning unit 118 solves a normal equation generated for each motion class number (motion classes MC1 to MC3) supplied from the motion classifying unit 116 for each waveform class, thereby obtaining an optimal prediction coefficient $w_i$ for each motion class for each waveform class. The prediction coefficients calculated are stored in memory areas mb1 to mb3 of the coefficient memory 55 shown in FIG. 8, corresponding to individual motion class numbers.

As described above, regarding a corrupted pixel, learning is performed so that corruption can be alleviated. SD_60P signals generated from SD_24P signals by frame interpolation are converted into HD_60P signals through a classification and adaptation process by using a prediction coefficient obtained by the learning. Thus, for example, it is possible to alleviate image corruption caused by error in assignment of detected vectors and to enhance resolution.

In what has been described above, in order to determine whether an image is corrupted, motion classes are used. Empirically, corruption (degradation) of an image that occurs when an interpolated frame is generated tends to occur in a region where motion vectors assigned to pixel vary considerably. Thus, it is possible to use a value representing variation in motion vectors assigned to pixels of a generated image as an evaluation value indicating the possibility of occurrence of corruption (degradation) of the image.

More specifically, for a subject pixel p in an interpolated frame t+k, an irregularity evaluation value is used, which is an example of a value representing variation among motion vectors. The irregularity evaluation value represents a result of evaluation of variation of a motion vector assigned to the subject pixel p with reference to motion vectors assigned to neighboring pixels.

As the irregularity evaluation value, for example, vector difference absolute summation (VDAS) or the sum of Euclid norms of difference vectors (NORM) is used.

First, VDAS will be described.

Figure 13:
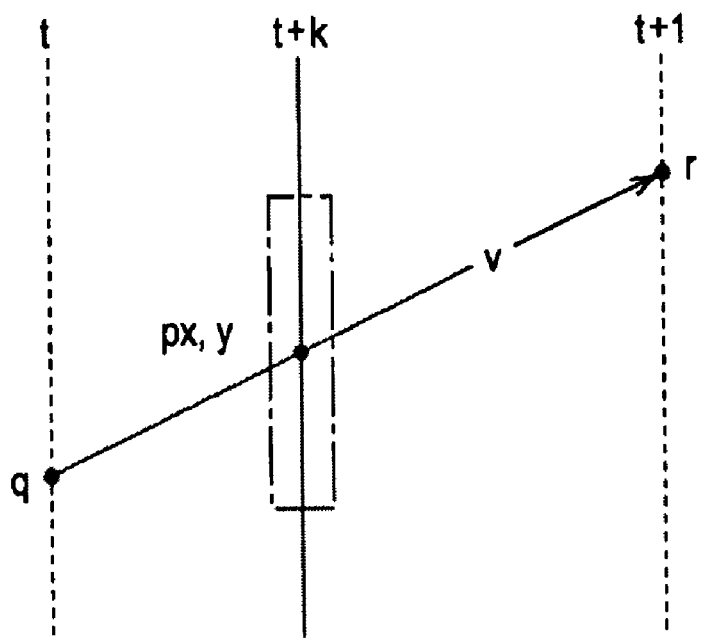
FIG. 13 is a diagram showing a range of pixels to which motion vectors used for calculation of a value representing variation are assigned.

For example, when a pixel $p_{x,y}$ on the interpolated frame t+k is a subject pixel as shown in FIG. 13, motion vectors assigned to pixels in a predetermined range centered at the subject pixel $p_{x,y}$, indicated by a single-dotted line, are read.

Figure 14:
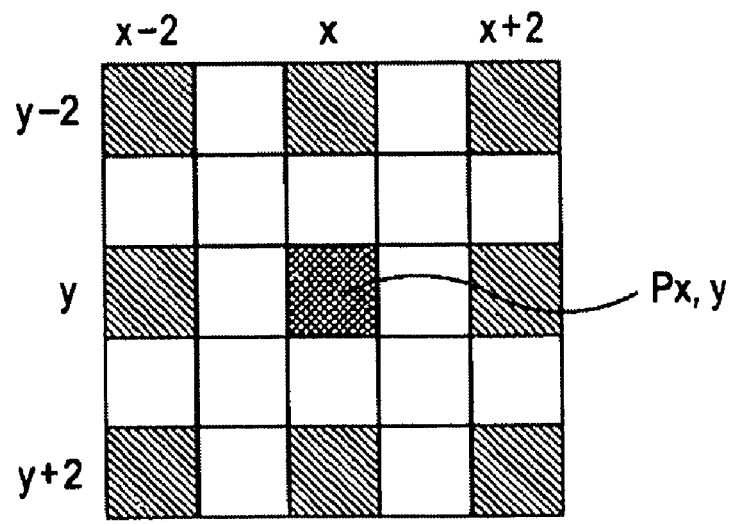
FIG. 14 is a diagram showing a range of pixels to which motion vectors are assigned.

More specifically, for example, when a motion vector is assigned for every other pixel, as shown in FIG. 14, regarding the subject pixel $p_{x,y}$ being considered on the interpolated frame, motion vectors assigned to pixels in a range of two pixels above, two pixels below, two pixels leftward, and two pixels rightward the subject pixel $p_{x,y}$ are read. That is, motion vectors assigned individually to a pixel $p_{x-2,y-2}$ that is two pixels above and two pixels leftward the subject pixel $p_{x,y}$, a pixel $p_{x,y-2}$ that is two pixels above the subject pixel $p_{x,y}$, a pixel $p_{x+2,y-2}$ that is two pixels above and two pixels rightward the subject pixel $p_{x,y}$, a pixel $p_{x-2,y}$ that is two pixels leftward the subject pixel $p_{x,y}$, a pixel $p_{x+2,y}$ that is two pixels rightward the subject pixel $p_{x,y}$, a pixel $p_{x-2,y+2}$ that is two pixels below and two pixels leftward the subject pixel $p_{x,y}$, a pixel $p_{x,y+2}$ that is two pixels below the subject pixel $p_{x,y}$, and a pixel $p_{x+2,y+2}$ that is two pixels below and two pixels rightward the subject pixel $p_{x,y}$ are read.

$VDAS_{t+k}(p_{x,y})$, which is VDAS for the subject pixel $p_{x,y}$ on the interpolated frame t+k, is calculated according to equation (10). In equation (10), max(a,b) denotes a function that chooses one of a and b having a larger value. $VDAS_{t+k}(p_{x,y})_x$ is calculated according to equation (11), and $VDAS_{t+k}(p_{x,y})_y$ is calculated according to equation (12). In equations (11) and (12), i=−2, 0, 2 and j=−2, 0, 2.

$$VDAS_{t+k}(p_{x,y}) = \max(VDAS_{t+k}(p_{x,y})_x, VDAS_{t+k}(p_{x,y})_y) \quad (10)$$

$$VDAS_{t+k}(p_{x,y})_x = \sum_{i,j} |V_{t+k}(p_{x+i,y+j})_x - V_{t+k}(p_{x,y})_x| \quad (11)$$

$$VDAS_{t+k}(p_{x,y})_y = \sum_{i,j} |V_{t+k}(p_{x+i,y+j})_y - V_{t+k}(p_{x,y})_y| \quad (12)$$

As described above, for example, in a case where motion vectors are assigned for each set of n pixels on an interpolated frame, a value representing variation of a motion vector assigned to a subject pixel with reference to motion vectors individually assigned to neighboring pixels that are distant by n pixels from the subject pixel.

Next, the sum of Euclid norms of difference vectors (NORM) will be described.

In a case where motion vectors are assigned for each set of two pixels as shown in FIG. 14, the sum of Euclid norms (NORM) of difference vectors at a point $p_{x,y}$ in an interpolated frame can be obtained according to equation (13) with reference to vectors in a range of 5×5 pixels. In equation (13), $V(p_{x,y})_x$ and $V(p_{x,y})_y$ denote x and y components of a subject vector, and $V(p_{x+i,y+j})_x$ and $V(p_{x+i,y+j})_y$ denote x and y components of a neighboring vector. Furthermore, in equation (13), i=−2, 0, 2, and j=−2, 0, 2.

$$NORM(p_{x,y}) = \sum_{i,j} \sqrt{\{V(p_{x+i,y+j})_x - V(p_{x,y})_x\}^2 + \{V(p_{x+i,y+j})_y - V(p_{x,y})_y\}^2} \quad (13)$$

Figure 15:
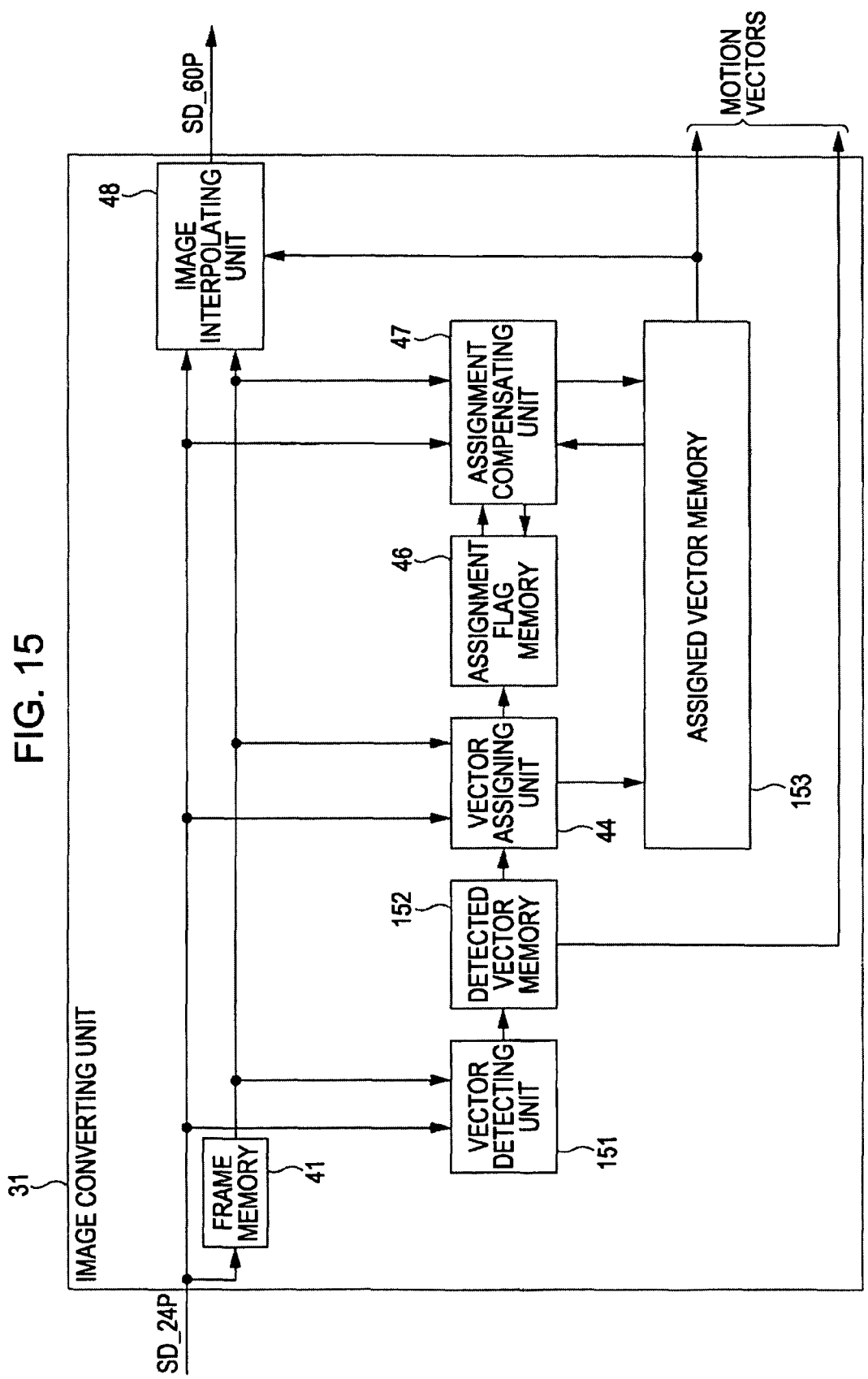
FIG. 15 is a block diagram showing another example configuration of the first image converting unit shown in FIG. 4.
Figure 16:
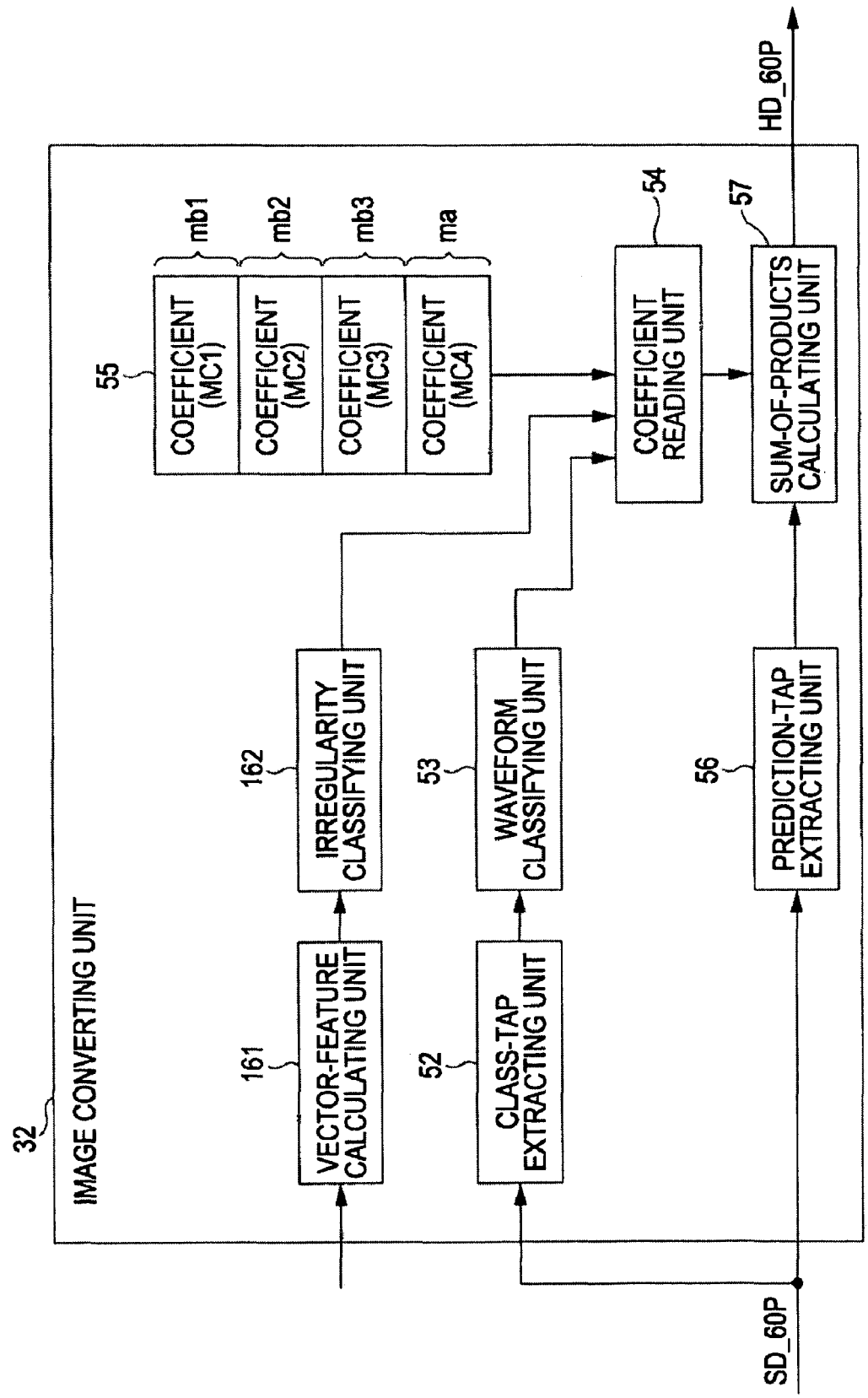
FIG. 16 is a block diagram showing another example configuration of the second image converting unit shown in FIG. 4.

FIGS. 15 and 16 are diagrams showing example configurations of the image converting unit 31 and the image converting unit 32 in a case where an irregularity evaluation value is used.

Compared with the image converting unit 31 shown in FIG. 5, the image converting unit 31 shown in FIG. 15 includes a vector detecting unit 151 instead of the vector detecting unit 42, a detected vector memory 152 instead of the detected vector memory 43, and an assigned vector memory 153 instead of the assigned vector memory 45.

Similarly to the vector detecting unit 42, the vector detecting unit 151 detects a motion vector between a subject block of a frame t on the frame memory 41 and a target block of a frame t+1, and stores the motion vector detected in the detected vector memory 152. However, as opposed to the vector detecting unit 42, the vector detecting unit 151 does not supply gradient information to the image converting unit 32.

The detected vector memory 152 stores a motion vector detected by the vector detecting unit 151 in the frame t, and supplies the motion vector to the image converting unit 32.

The assigned vector memory 153 stores a motion vector assigned by the vector assigning unit 44 in association with each pixel of an interpolated frame, and supplies the motion vector to the image converting unit 32.

Compared with the image converting unit 32 shown in FIG. 8, the image converting unit 32 shown in FIG. 16 includes a vector-feature calculating unit 161, and a irregularity classifying unit 162 instead of the motion classifying unit 51.

The vector-feature calculating unit 161 reads, for example, a motion vector assigned to a subject pixel on an interpolated frame of SD_60P signals supplied from (the image interpolating unit 48 of) the image converting unit 31 to the image converting unit 32, and motion vectors of neighboring pixels in a predetermined neighboring range of the subject pixel from (the detected vector memory 152 or the assigned vector memory 153 of the image converting unit 31). Then, the vector-feature calculating unit 161 calculates a value representing variation among these motion vectors, such as VDAS or NORM described earlier.

The irregularity classifying unit 162 determines whether an image is corrupted at the subject pixel currently being considered on the interpolated frame (i.e., determines whether the subject pixel is a corrupted pixel).

Figure 17:
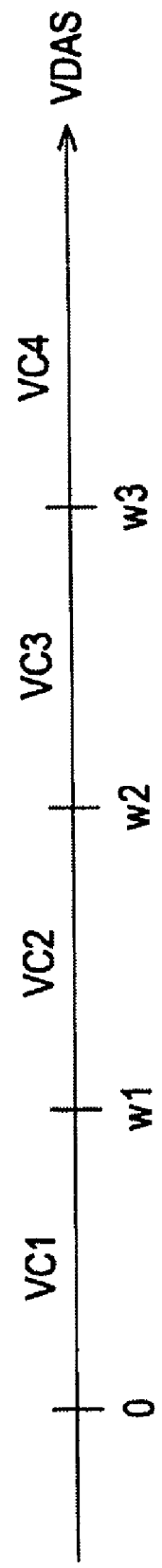
FIG. 17 is a diagram showing an example of irregularity classification.

More specifically, for example, when a VDAS value is supplied from the vector-feature calculating unit 161, as shown in FIG. 17, the irregularity classifying unit 162 determines that the current subject pixel is a corrupted pixel and classifies the subject pixel into an irregularity class VC4 if the VDAS value is greater than or equal to a value w3. If the VDAS value is less than the value w3, the irregularity classifying unit 162 determines that the subject pixel is not a corrupted pixel and classifies the subject pixel into one of irregularity classes VC1 to VC3. The irregularity classifying unit 162 classifies the subject pixel into the irregularity class VC1 if the VDAS value is less than a value w1, into the irregularity class VC2 if the VDAS value is greater than or equal to the value w1 and less than a value w2, and into the irregularity class VC3 if the VDAS value is greater than or equal to the value w2 and less than the value w3.

Figure 18:
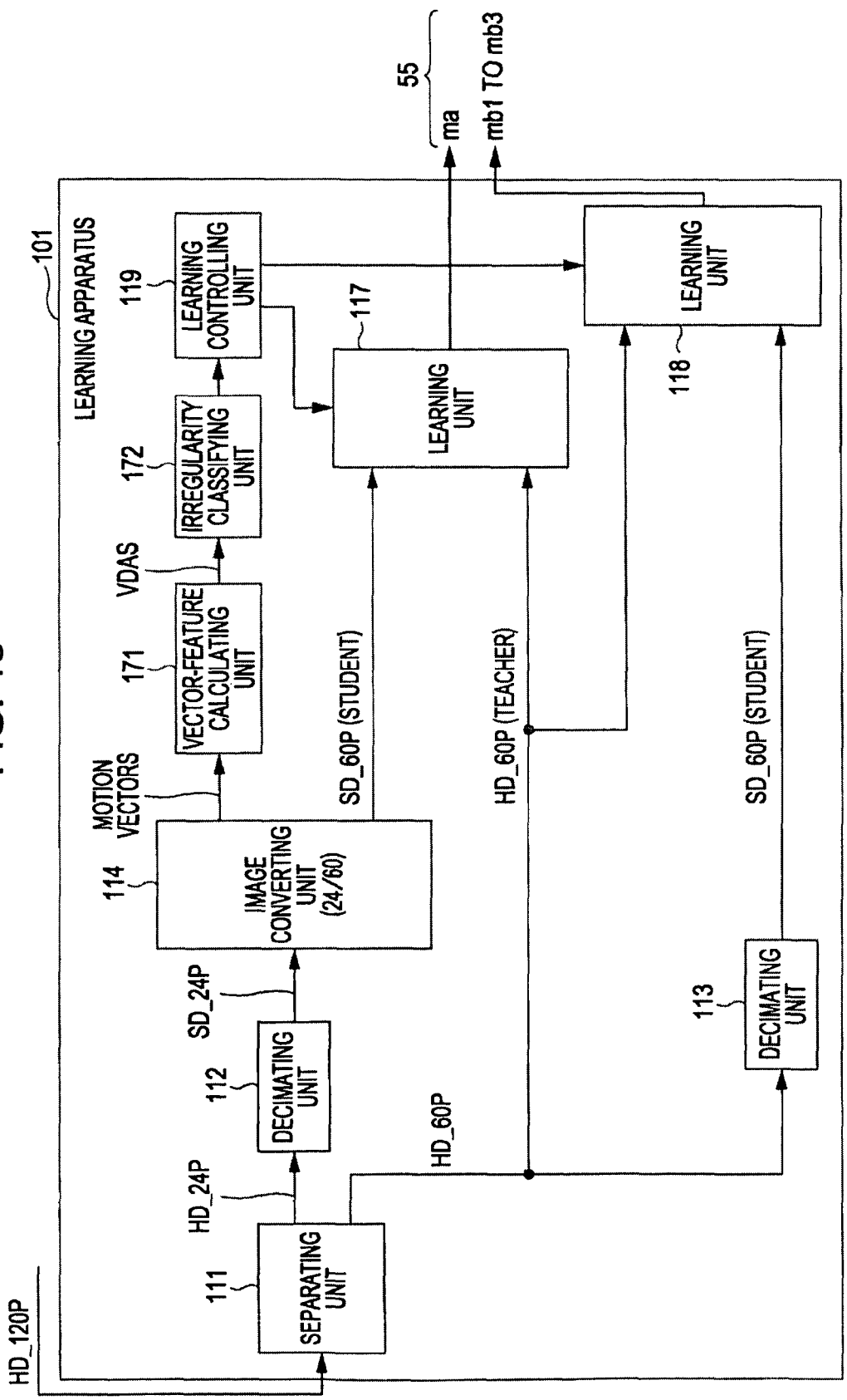
FIG. 18 is a block diagram showing another example configuration of a learning apparatus according to an embodiment of the present invention.

FIG. 18 shows an example configuration of the learning apparatus 101 in a case where irregularity classes are used. Compared with the learning apparatus 101 shown in FIG. 10, the learning apparatus 101 shown in FIG. 18 includes a vector-feature calculating unit 171, and an irregularity classifying unit 172 instead of the motion classifying unit 116.

Similarly to the vector-feature calculating unit 161 shown in FIG. 16, for example, the vector-feature calculating unit 171 reads a motion vector assigned to a subject pixel being considered on an interpolated frame of SD_60P signals output from the image converting unit 114, and motion vectors assigned to neighboring pixels in a predetermined neighboring range of the subject pixel. Then, the vector-feature calculating unit 171 calculates a value representing variation among these motion vectors.

Similarly to the irregularity classifying unit 162 shown in FIG. 16, for example, in a case where a VDAS value is supplied from the vector-feature calculating unit 171, as shown in FIG. 17, if the VDAS value is greater than or equal to the value w3, the irregularity classifying unit 172 determines the current subject pixel as a corrupted pixel and classifying the subject pixel into the irregularity class VC4. On the other hand, if the VDAS value is less than the value w3, the irregularity classifying unit 172 determines that the subject pixel is not a corrupted pixel and classifies the subject pixel into one of the irregularity classes VC1 to VC3. The irregularity classifying unit 172 classifies the subject pixel into the irregularity class VC1 if the VDAS value is less than the value w1, into the irregularity class VC2 if the VDAS value is greater than or equal to the value w1 and less than the value w2, and into the irregularity class VC3 if the VDAS value is greater than or equal to the value w2 and less than the value w3.

For example, in the learning apparatus 101 described earlier with reference to FIG. 10, if a subject pixel is a correct pixel, ordinary learning for enhancing resolution is performed (the learning unit 118), and prediction coefficients obtained through the learning are stored in the coefficient memory 55. Since the learning is a process that is performed generally, in some cases, an image processing apparatus storing coefficients obtained through the learning process is already available in the form of a large scale integration (LSI). Thus, the configuration may be such that learning is performed only in the case of a corrupted pixel and a part of a coefficient memory of the existing image processing apparatus is replaced with coefficients obtained as a result of the learning.

More specifically, the memory areas mb1 to mb3 of the coefficient memory 55 shown in FIG. 8 store prediction coefficients stored in advance in an existing image processing apparatus, and the content of the memory area ma is replaced with prediction coefficients obtained through the learning using a corrupted pixel.

Figure 19:
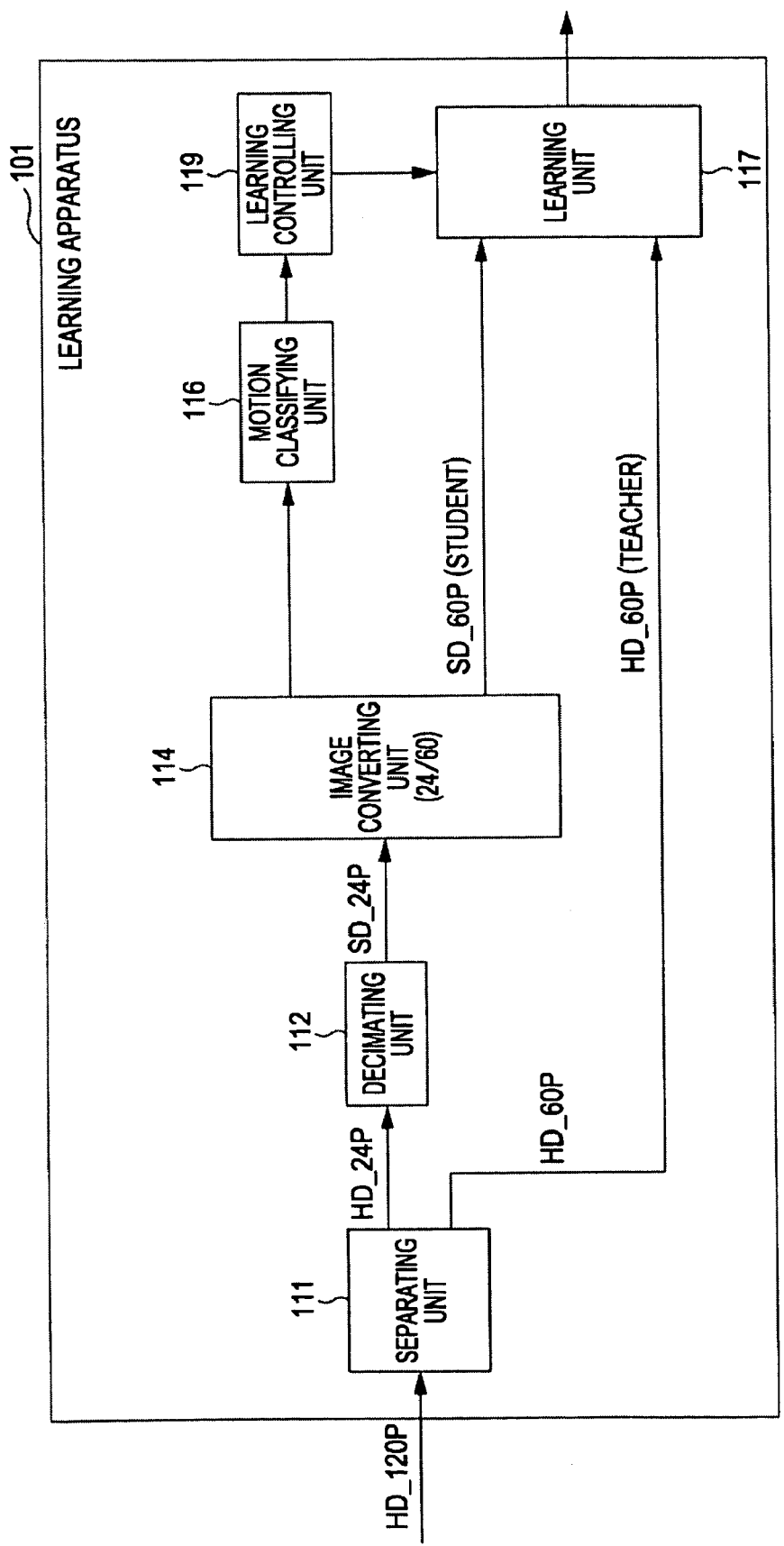
FIG. 19 is a block diagram showing another example configuration of a learning apparatus according to an embodiment of the present invention.
Figure 20:
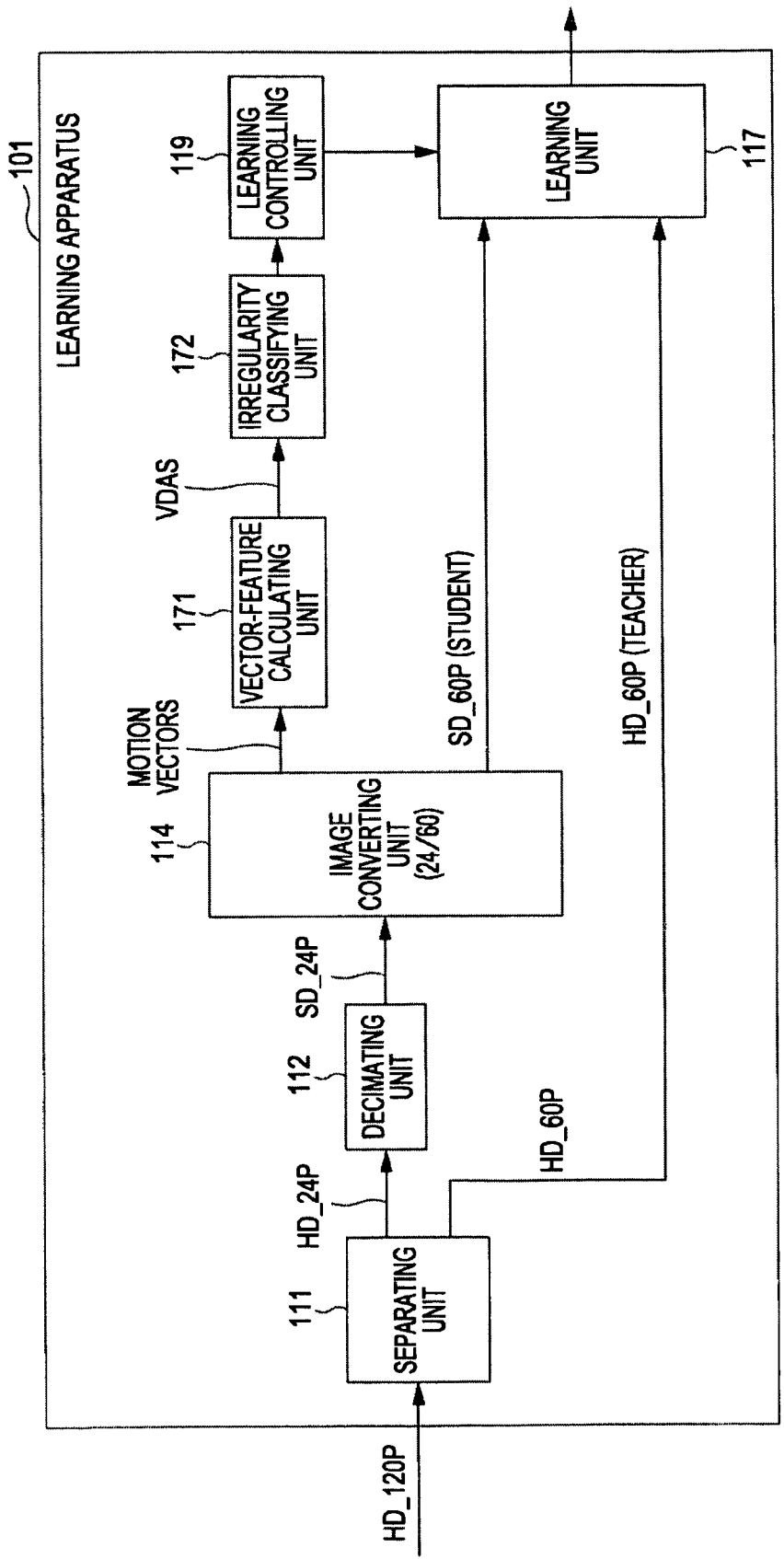
FIG. 20 is a block diagram showing another example configuration of a learning apparatus according to an embodiment of the present invention.

FIGS. 19 and 20 show an example configuration of the learning apparatus 101 that performs learning only in the case of a corrupted pixel. More specifically, compared with the learning apparatus 101 shown in FIG. 10, the learning apparatus 101 shown in FIG. 19 does not include the decimating unit 113 and the learning unit 118. Compared with the learning apparatus 101 shown in FIG. 18, the learning apparatus 101 shown in FIG. 20 does not include the decimating unit 113 and the learning unit 118.

Next, an example operation of the image processing apparatus 1 according to the embodiment will be described.

First, relationship between correct and corrupted pixels of an image used in this example and motion classes will be described.

Figure 21:
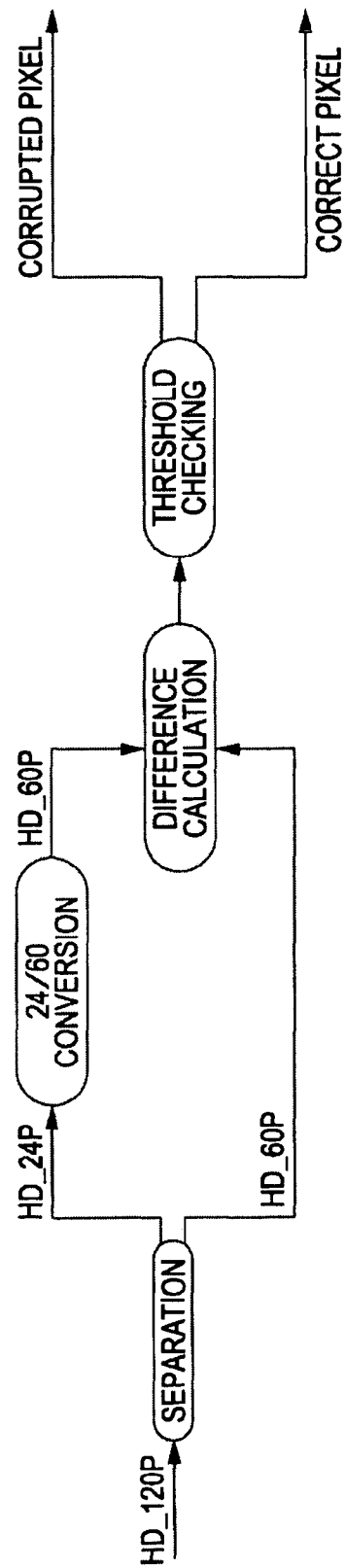
FIG. 21 is a diagram showing a method of analysis for finding distribution of motion classes.

As shown in FIG. 21, HD_120P signals are separated into HD_24P signals and HD_60P signals. Then, HD_60P signals are generated by interpolating frames in the HD_24P signals. Then, differences are calculated individually between the pixels of the HD_60P signals generated by frame interpolation and the corresponding pixels of the corresponding frame of the HD_60P signals separated from the HD_120P signals. Pixels with differences greater than a predetermined threshold are determined as corrupted pixels, while pixels with differences less than or equal to the predetermined threshold are determined as correct pixels.

Figure 22:
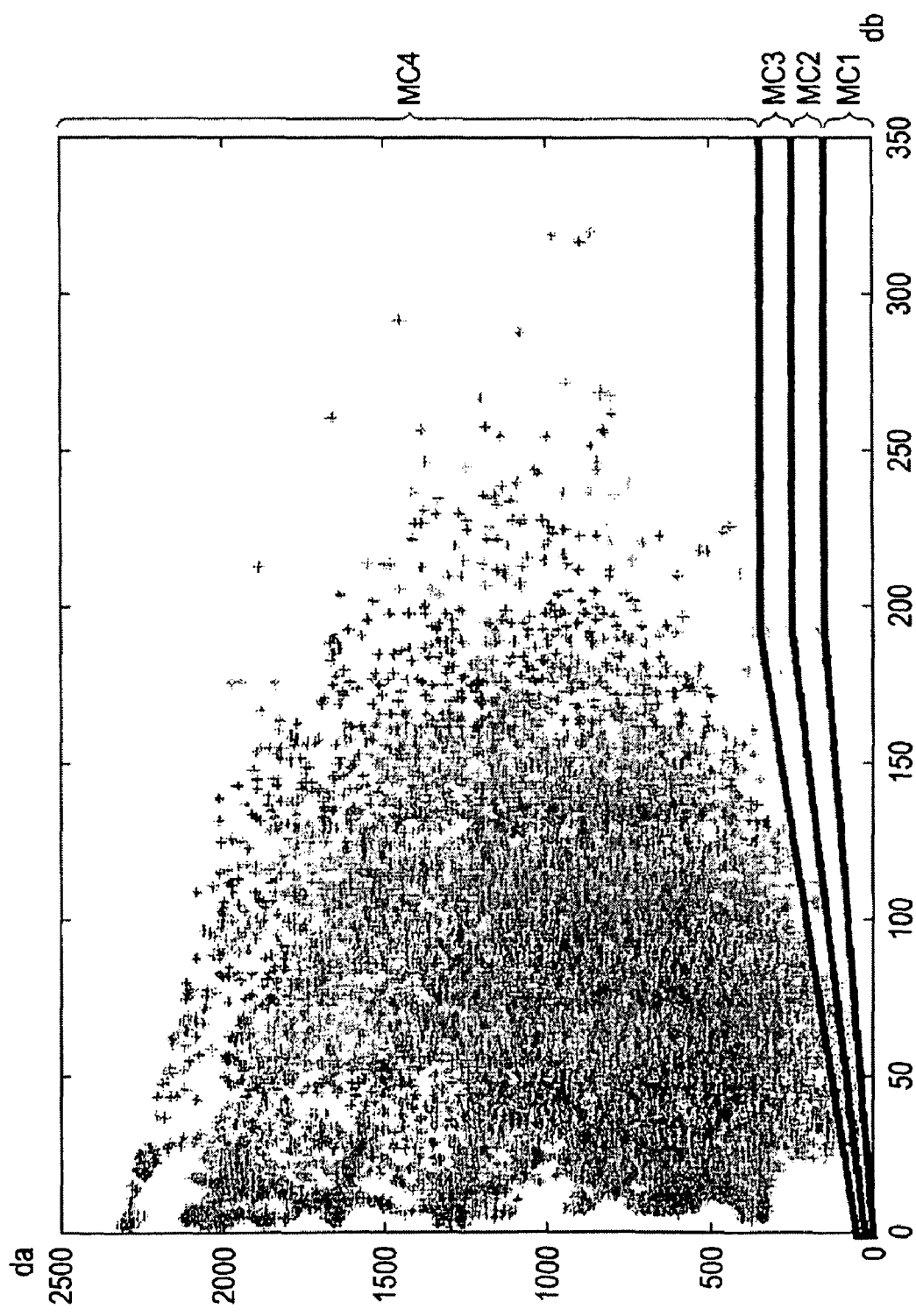
FIG. 22 is a diagram showing an example of distribution of corrupted pixels.
Figure 23:
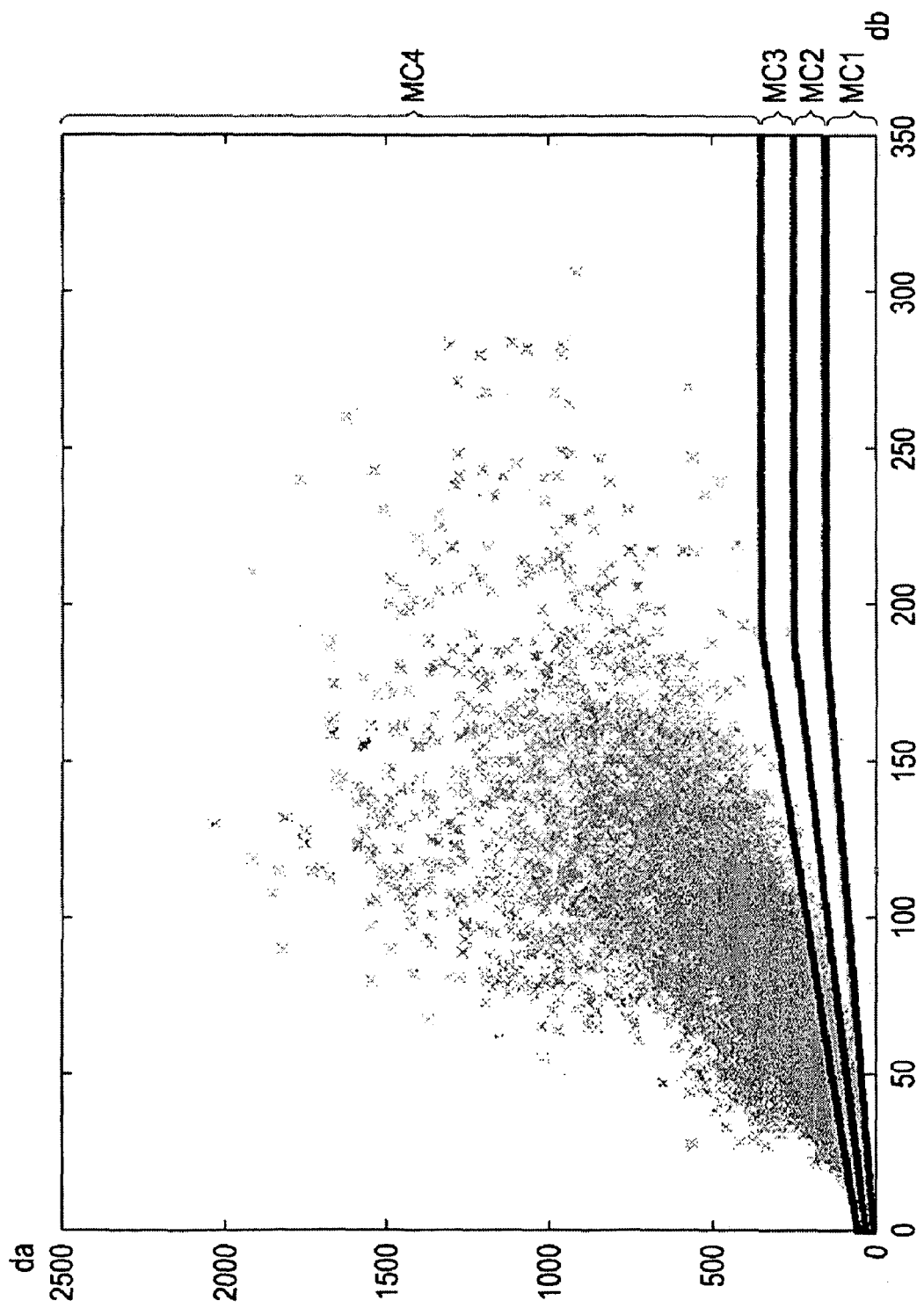
FIG. 23 is a diagram showing an example of distribution of correct pixels.
Figure 24:
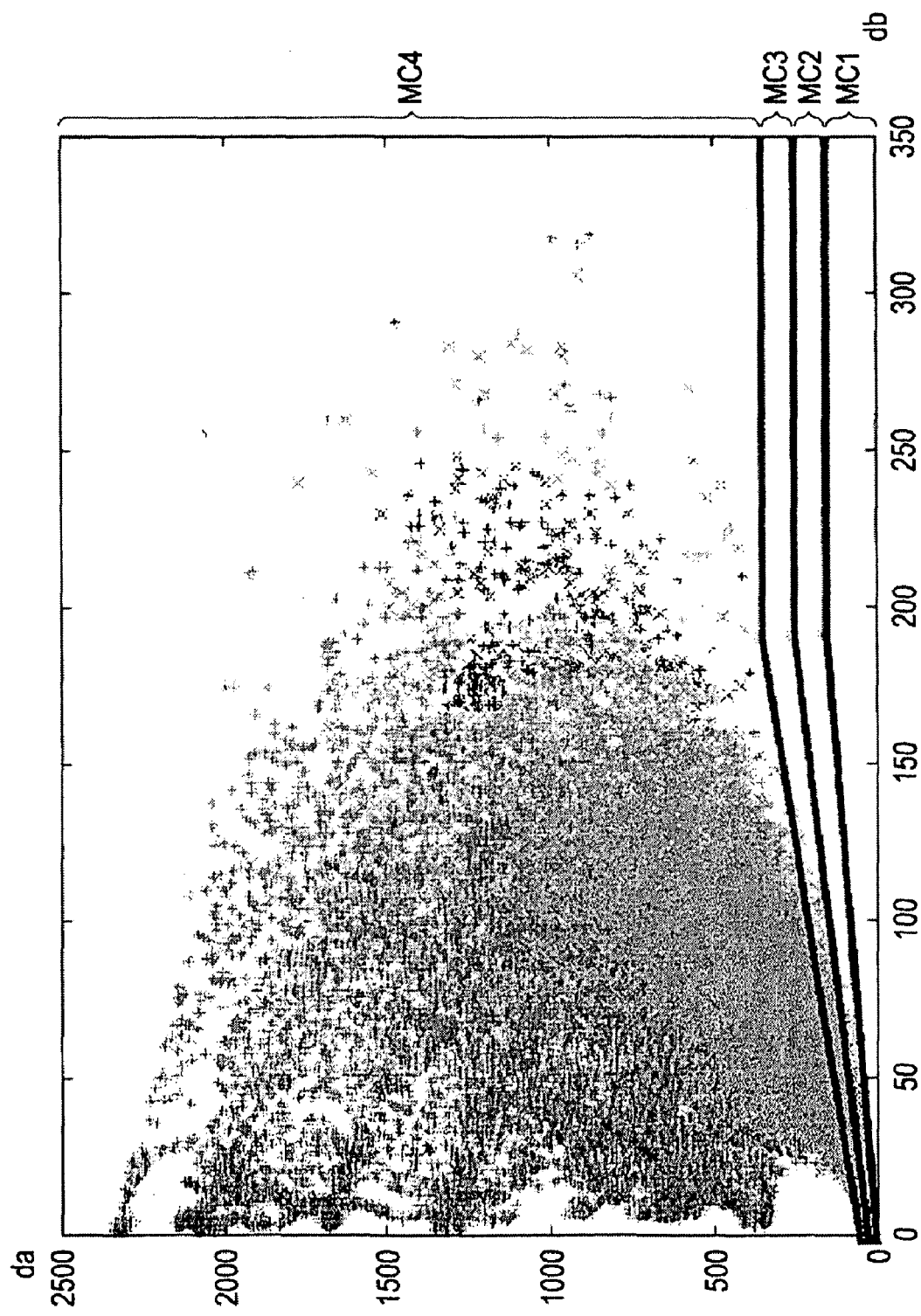
FIG. 24 is a diagram showing together the distribution of corrupted pixels shown in FIG. 22 and the distribution of correct pixels shown in FIG. 23.

FIG. 22 shows the distribution of motion classes of corrupted pixels, obtained by analyzing an image, and FIG. 23 shows the distribution of motion classes of correct pixels, obtained by analyzing the image. In this example, a vector feature represents values of a temporal gradient and a spatial gradient, and motions are classified on the basis of these values. FIG. 24 shows together the distribution of motion classes of corrupted pixels shown in FIG. 22 and the distribution of motion classes of correct pixels shown in FIG. 23.

Figure 25:
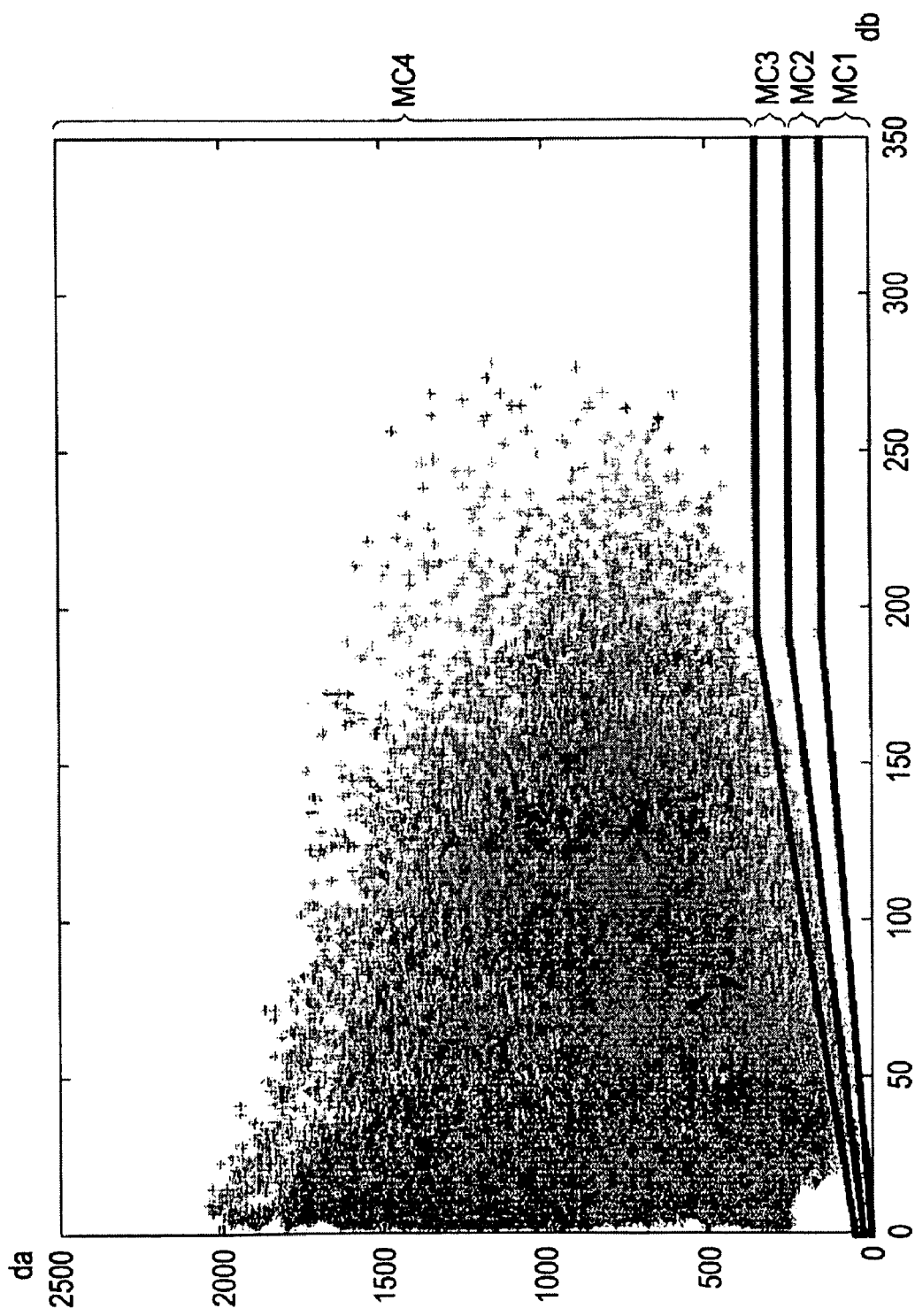
FIG. 25 is a diagram showing another example of distribution of corrupted pixels.
Figure 26:
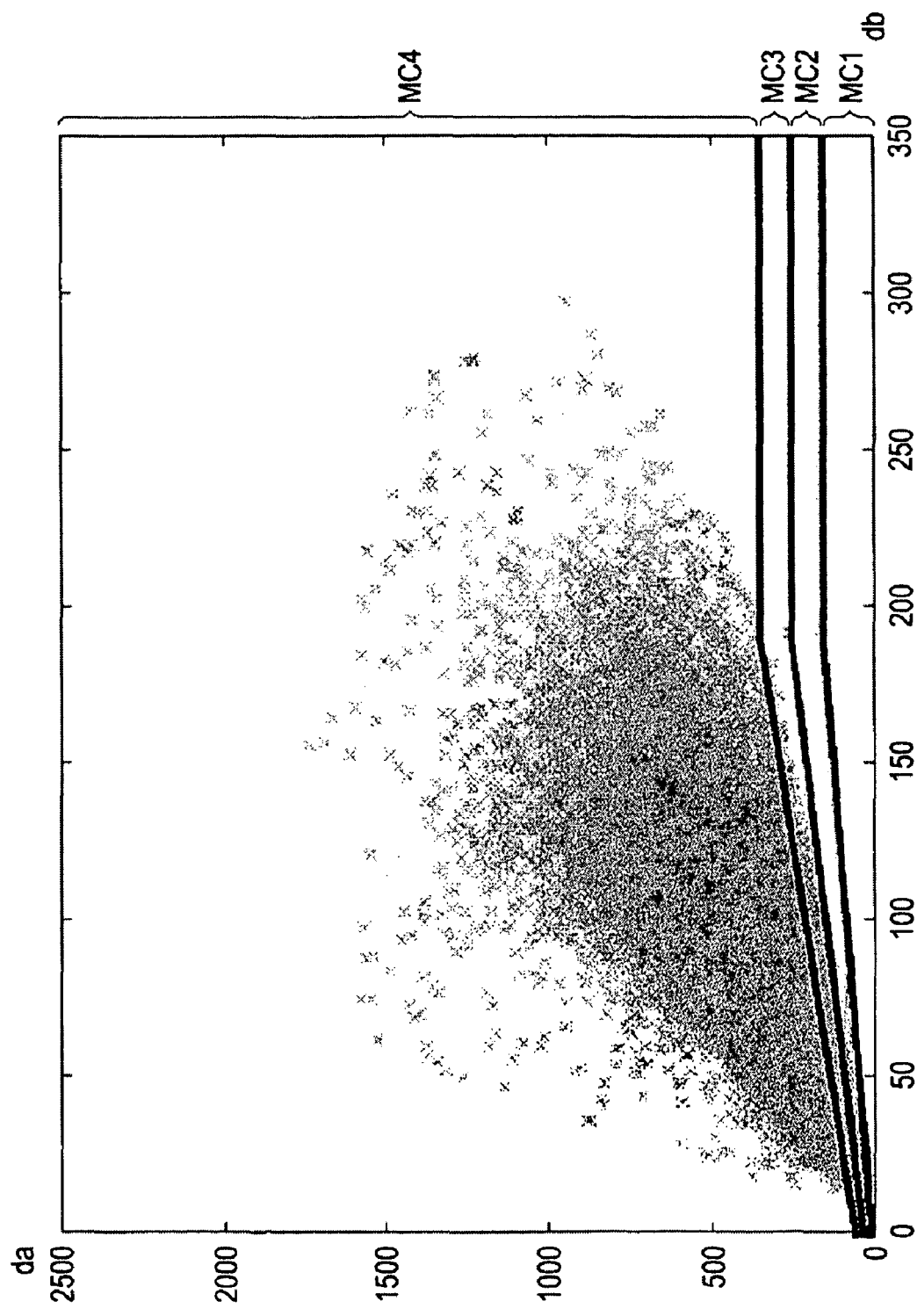
FIG. 26 is a diagram showing another example of distribution of correct pixels.
Figure 27:
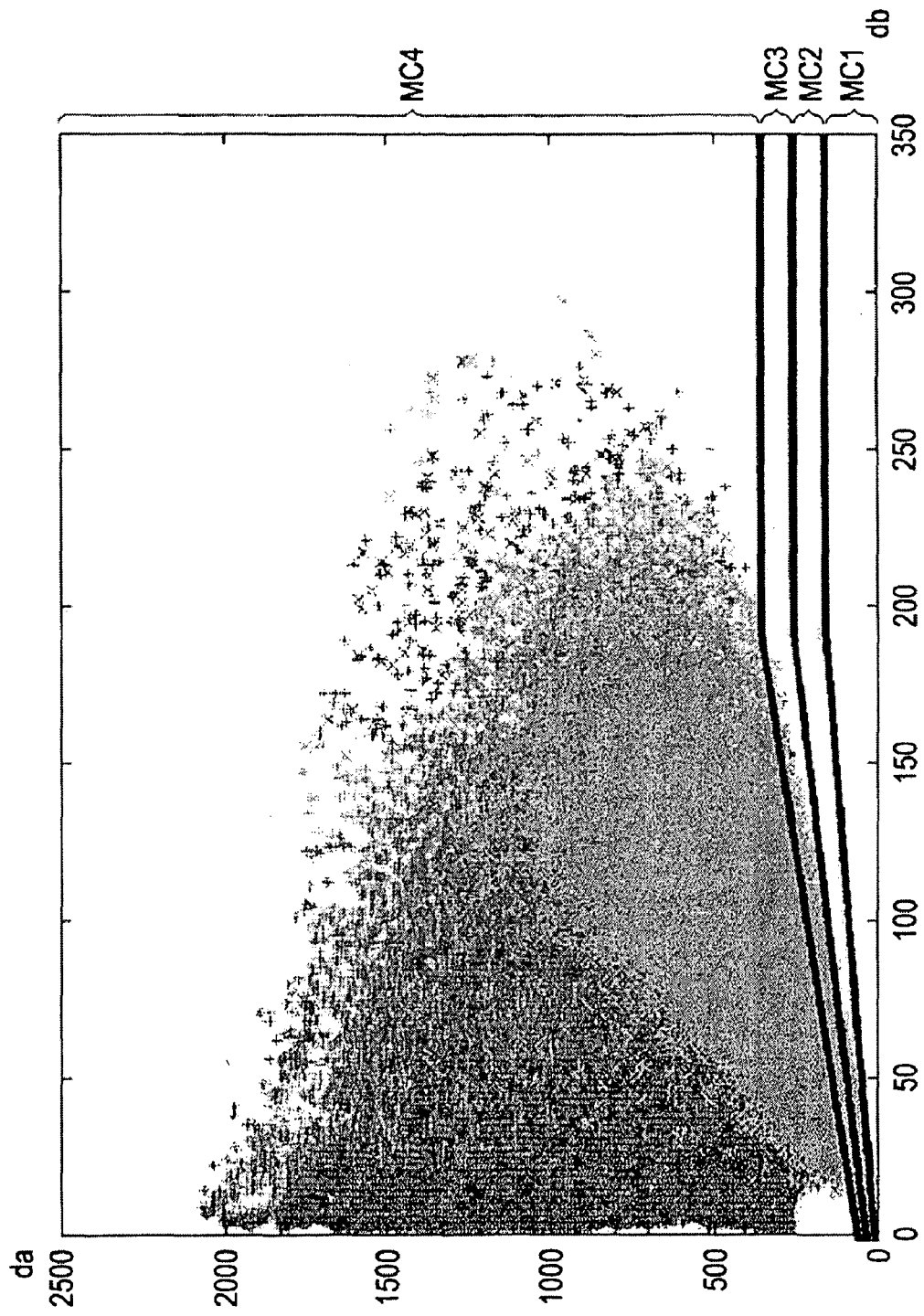
FIG. 27 is a diagram showing together the distribution of corrupted pixels shown in FIG. 25 and the distribution of correct pixels shown in FIG. 26.

FIG. 25 shows the distribution of motion classes of corrupted pixels and FIG. 26 shows the distribution of motion classes of correct pixels, obtained by analyzing another image. FIG. 27 shows together the distribution of motion classes of corrupted pixels shown in FIG. 25 and the distribution of motion classes of correct pixels shown in FIG. 26.

In the examples shown in FIGS. 22 to 27, most corrupted pixels are classified into the motion class MC4, and most correct pixels are classified into the motion classes MC1 to MC3. Thus, in this example, existing prediction coefficients are used for the motion classes MC1 to MC3, and prediction coefficients obtained as a result of the learning performed by using corrupted pixels, described earlier, are used only for the motion class MC4.

Figure 28:
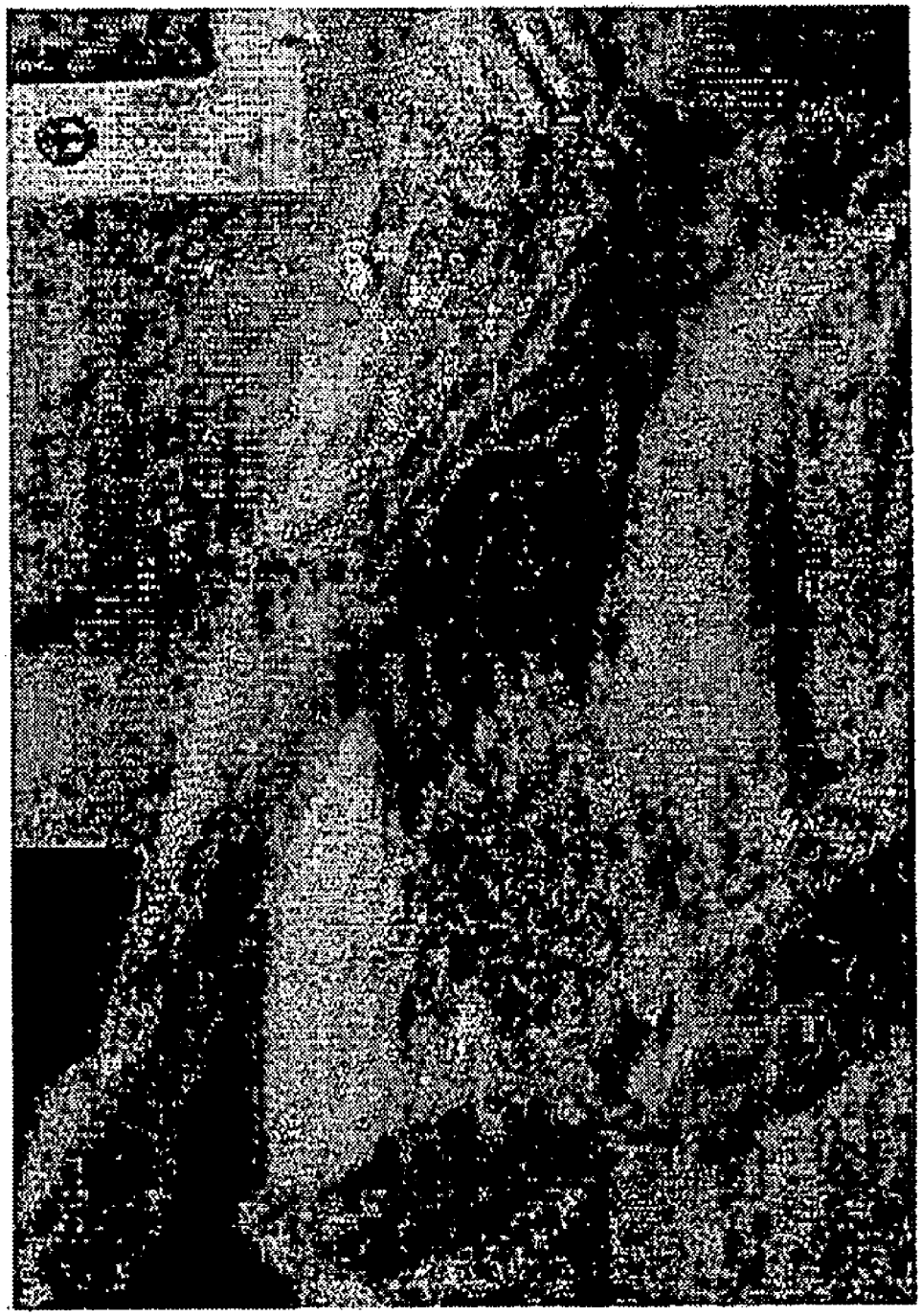
FIG. 28 shows an example of display by an image processing apparatus according to an embodiment of the present invention.
Figure 29:
FIG. 29 shows an example of display by an image processing apparatus according to a related art.

FIG. 28 shows an example of an image of HD_60P signals generated by using the prediction coefficients for the motion class MC4, obtained as a result of the learning performed by using corrupted pixels. FIG. 29 shows an example of an image of HD_60P signals generated by using existing prediction coefficients (i.e., prediction coefficients obtained as a result of ordinary learning for enhancing resolution) also for the motion class MC4. Image corruption is observed in the image shown in FIG. 29, and the image corruption is alleviated in the image shown in FIG. 28.

Figure 30:
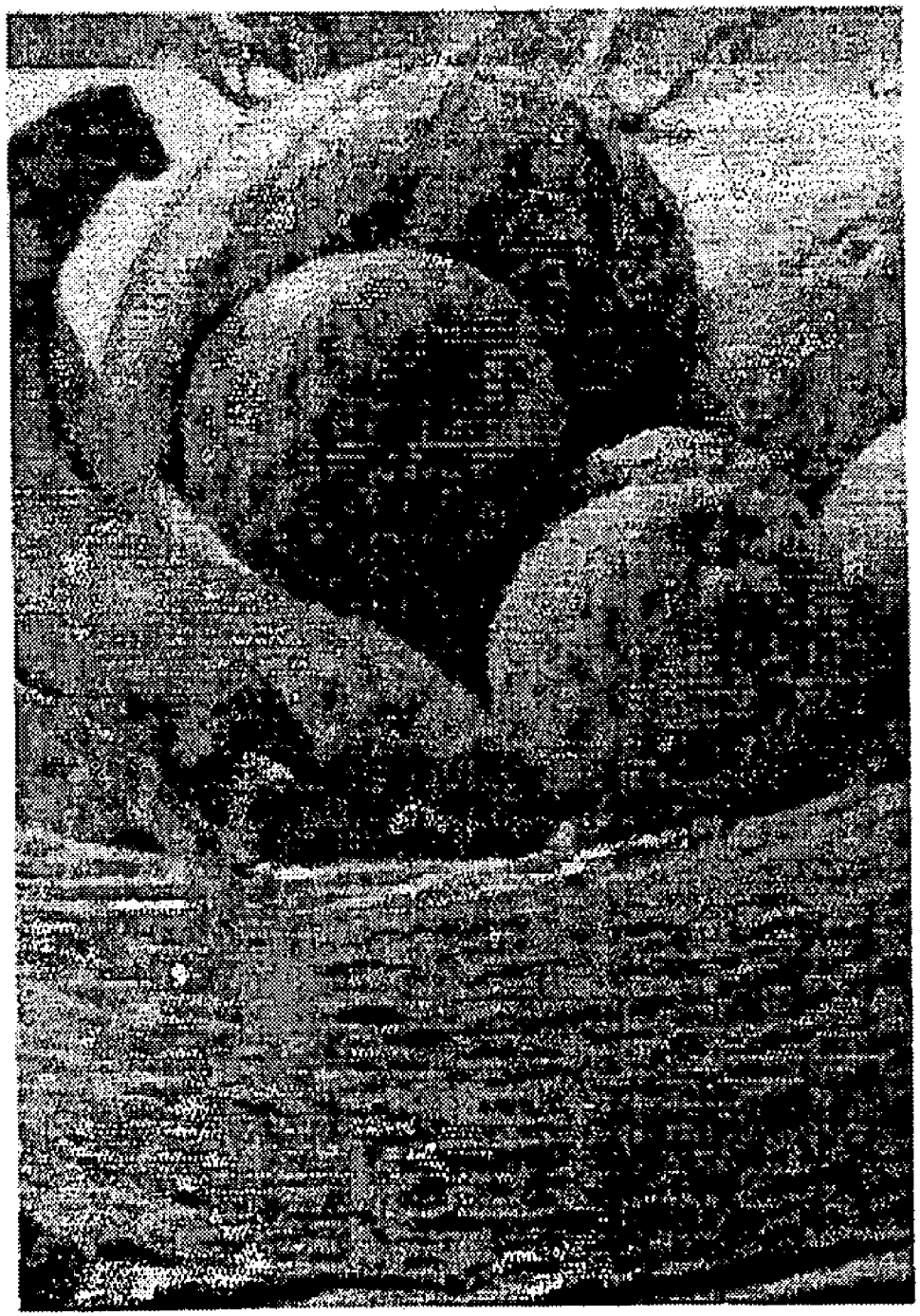
FIG. 30 shows another example of display by an image processing apparatus according to an embodiment of the present invention.
Figure 31:
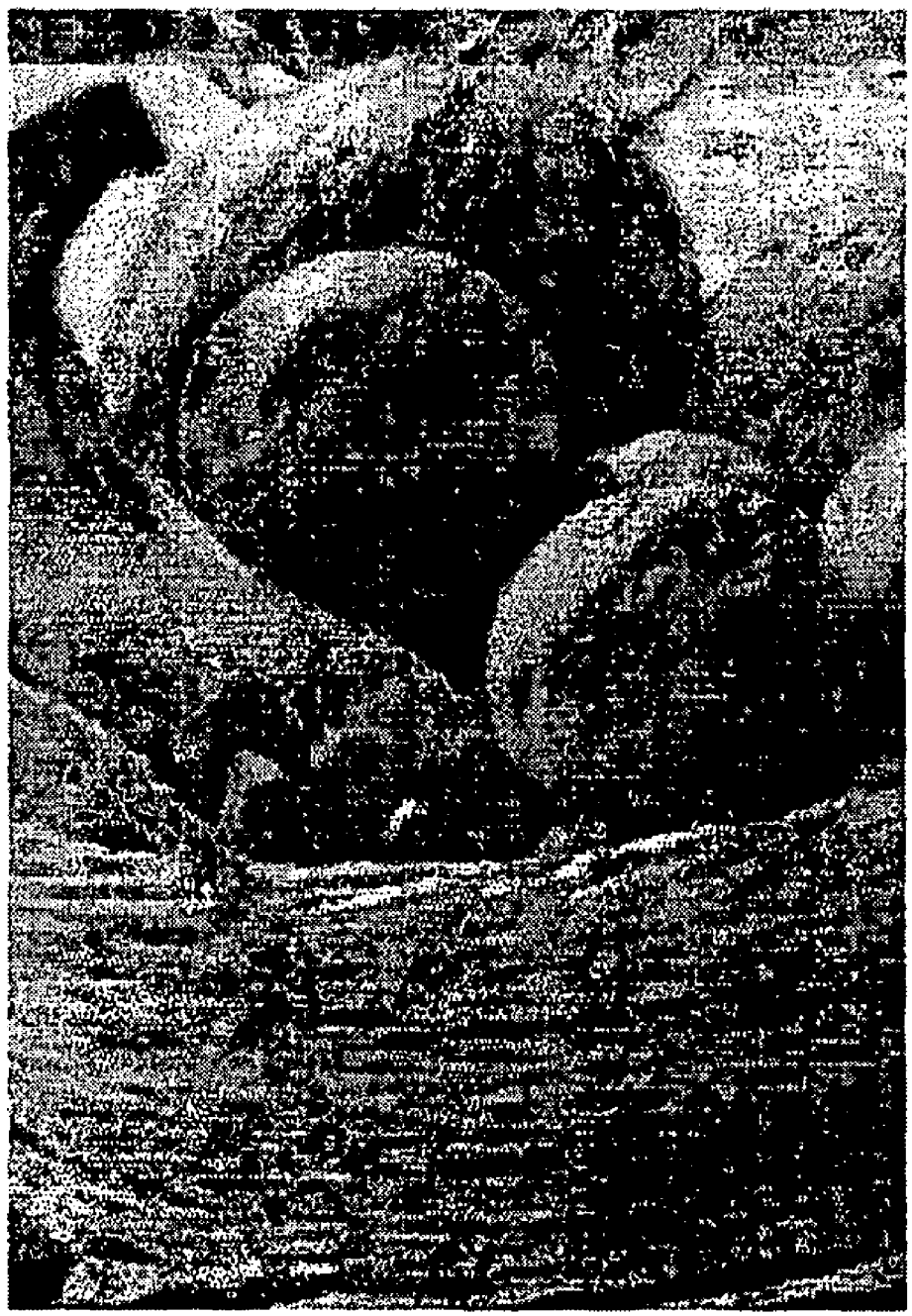
FIG. 31 shows another example of display by an image processing apparatus according to a related art.

FIG. 30 shows an example of an image of HD_60P signals generated by using the predication coefficients for the motion class MC4, obtained as a result of the learning performed by using corrupted pixels. FIG. 31 shows an example of an image of HD_60P signals generated by using existing prediction coefficients (i.e., prediction coefficients obtained as a result of ordinary learning for enhancing resolution) also for the motion class MC4. In this example, since the image that is subject to processing is a still picture, a considerable difference is not observed between these images.

In the example described above, prediction coefficients obtained through learning by the learning apparatus 101 are stored in advance in a coefficient memory, and HD_60P signals are generated by using the prediction coefficients, so that image corruption due to error in assignment of detected vectors is alleviated. That is, the quality of an image after frame frequency conversion is improved by alleviating corruption in corrupted regions while enhancing resolution in uncorrupted regions.

However, although it is possible to enhance resolution in uncorrupted regions, in corrupted regions, the alleviation of corruption results in a reduced resolution. That is, when a process of alleviating corruption due to error in detected vectors is performed, there exists a tradeoff relationship between the degree of alleviating corruption and enhancement of resolution. Thus, in accordance with user's preference, i.e., by allowing a user to set parameters for determining the degree of alleviating corruption and resolution, prediction coefficients may be generated in accordance with the parameters.

Figure 32:
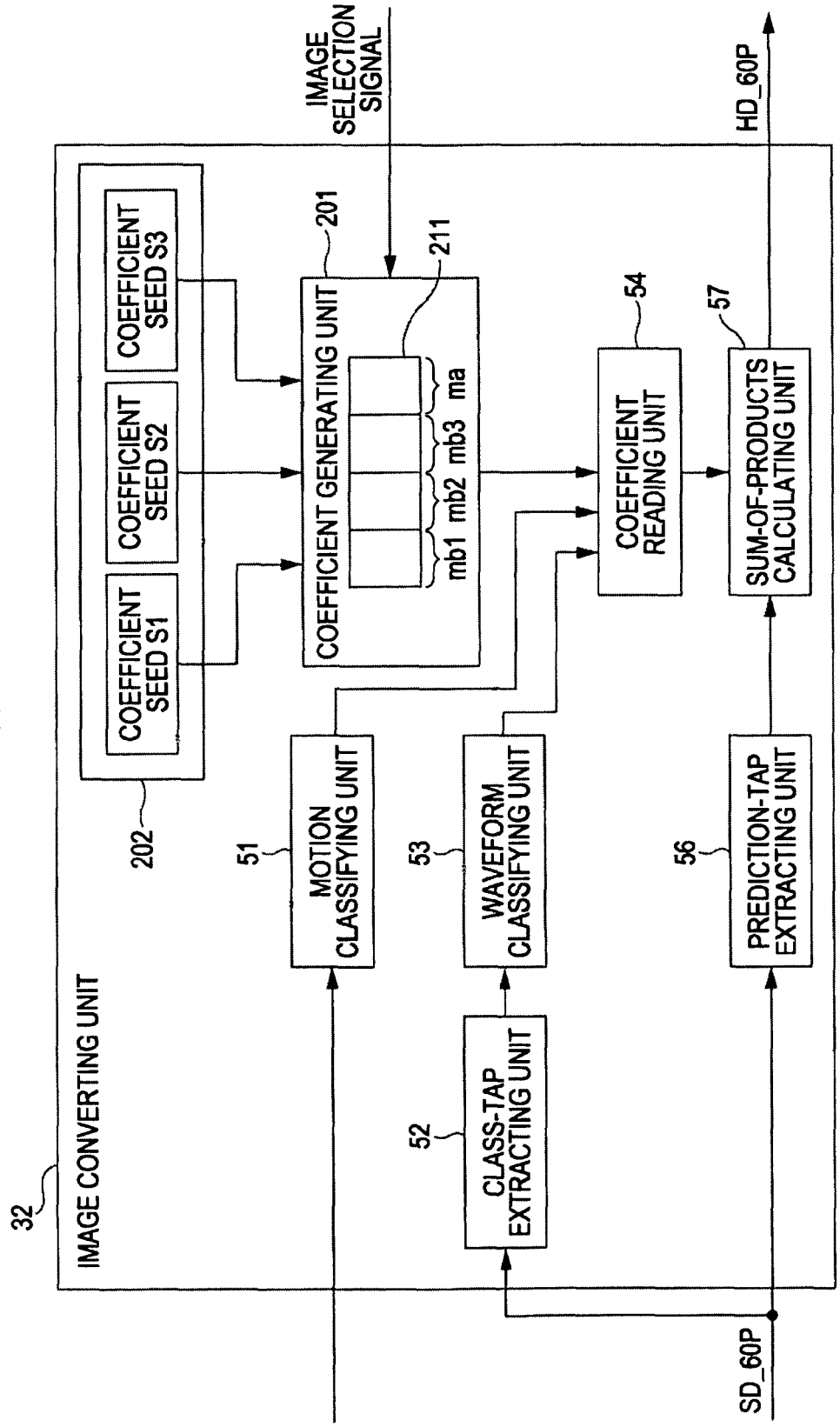
FIG. 32 is a block diagram showing another example configuration of the second image converting unit shown in FIG. 4.

That is, as opposed to the coefficient memory 55 of the image converting unit 32 shown in FIG. 8, in which fixed prediction coefficients are stored, the image converting unit 32 shown in FIG. 32 generates prediction coefficients in accordance with the value of an image selection signal input by the user, and generates HD_60P signals by using the prediction coefficients generated.

FIG. 32 shows an example configuration of the image converting unit 32 in a case where prediction coefficients are generated in accordance with the value of an image selection signal input by a user.

Similarly to the image converting unit 32 shown in FIG. 8, the image converting unit 32 shown in FIG. 32 includes the motion classifying unit 51, the class-tap extracting unit 52, the waveform classifying unit 53, the coefficient reading unit 54, the prediction-tap extracting unit 56, and the sum-of-products calculating unit 57. However, the image converting unit 32 shown in FIG. 32 differs in that it includes a coefficient generating unit 201 and a coefficient seed memory 202 instead of the coefficient memory 55.

For example, the coefficient generating unit 201 receives an image selection signal from the input unit 16 shown in FIG. 3. The image selection signal represents a parameter for determining the degree of alleviating corruption and determining resolution, input by a user's operation.

For example, the coefficient generating unit 201 generates prediction coefficients by performing function approximation among three types of coefficient seeds S1 to S3 stored in the coefficient seed memory 202 in accordance with the value of an image selection signal input by a user from the input unit 16 shown in FIG. 3. The coefficient generating unit 201 includes a register 211, and stores prediction coefficients generated in corresponding regions of the register 211.

The register 211 has areas mb1 to mb4 corresponding to motion class numbers that can be supplied from the motion classifying unit 51 (i.e., corresponding to possible motion classes), and the areas mb1 to mb4 store prediction coefficients generated for individual waveform classes.

The coefficient seed memory 202 stores three types of coefficient seeds S1 to S3 that serve as seeds of prediction coefficients generated by the coefficient generating unit 201.

FIG. 33 is a diagram showing an example of the coefficient seeds S1 to S3. In the example shown in FIG. 33, the coefficient seeds S1 to S3 are composed of prediction coefficients obtained for the motion classes MC1 to MC4 shown in FIG. 9.

More specifically, the coefficient seed S1 is composed of prediction coefficients (referred to as resolution enhancing coefficients) generated individually for the motion classes MC1 to MC3 by a learning process performed by using correct pixels (an ordinary learning process for enhancing resolution), and prediction coefficients (referred to as corruption countermeasure coefficients) generated for the motion class MC4 by a learning process performed by using corrupted pixels.

Figure 10:
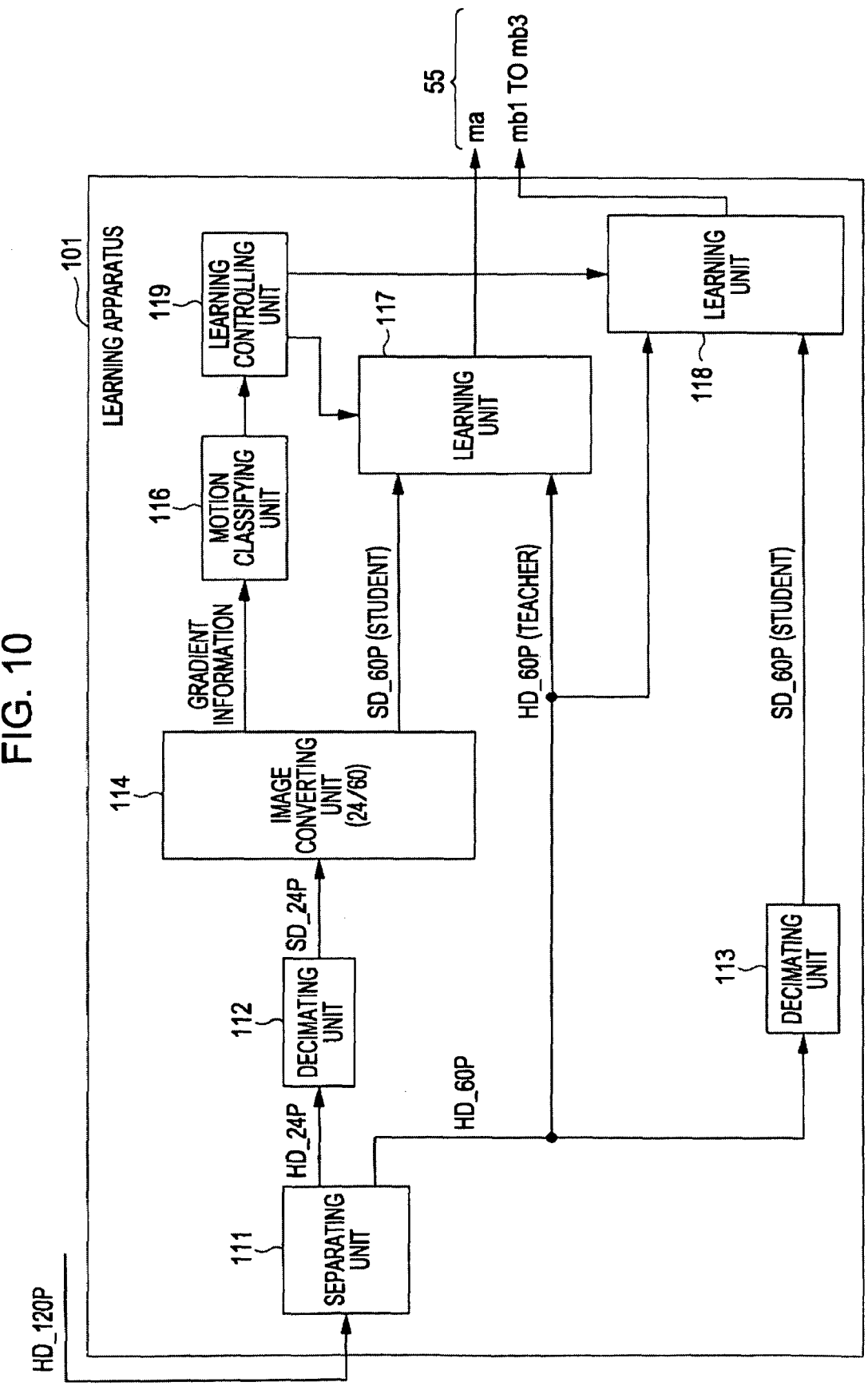
FIG. 10 is a block diagram showing an example configuration of a learning apparatus according to an embodiment of the present invention.

The coefficient seed S1 is generated by the learning apparatus 101 shown in FIG. 10 or FIG. 19, described earlier, and is supplied to and stored in the coefficient seed memory 202.

For example, in the case of the learning apparatus 101 shown in FIG. 19, the learning unit 117 is controlled to perform a learning process in accordance with a motion class number supplied from the motion classifying unit 116. More specifically, if the motion class number supplied from the motion classifying unit 116 represents the motion class MC4 (FIG. 9), the learning controlling unit 119 determines that motion is large and the current subject pixel is a corrupted pixel. Then, the learning unit 117 performs a learning process by using the pixel determined as a corrupted pixel. Prediction coefficients obtained as a result of the learning process serve as corruption countermeasure coefficients for the motion class MC4 in the coefficient seed S1, and are supplied to and stored in the coefficient seed memory 202 shown in FIG. 32.

On the other hand, if the motion class number supplied from the motion classifying unit 116 represents one of the motion classes MC1 to MC3 (FIG. 9), i.e., if it is determined that motion is small and the current subject pixel is a correct pixel, the learning unit 117 performs a learning process by using the pixel determined as a correct pixel (an ordinary learning process for enhancing resolution). Prediction coefficients generated as a result of the learning process serve as resolution enhancing coefficients for the motion classes MC1 to MC3 in the coefficient seed S1, and are supplied to and stored in the coefficient seed memory 202 shown in FIG. 32.

That is, the prediction coefficients of the coefficient seed S1 are the same as the prediction coefficients stored in the memory areas mb1 to mb3 and ma of the coefficient memory 55, described earlier.

The coefficient seed S2 is composed of resolution enhancing coefficients generated individually for the motion classes MC1 to MC4 through a learning process performed by using correct pixels. For example, the coefficient seed S2 is generated by the learning unit 118 of the learning apparatus 101 shown in FIG. 10, described earlier, pr by the learning apparatus 101 shown in FIG. 36, which will be described later, and is supplied to and stored in the coefficient seed memory 202.

The coefficient seed S3 is composed of corruption countermeasure coefficients generated individually for the motion classes MC1 to MC4 through a learning process performed by using corrupted pixels. For example, the coefficient seed S3 is generated by the learning apparatus 101 shown in FIG. 37, which will be described later, and is supplied to and stored in the coefficient seed memory 202.

The coefficient reading unit 54 refers to an area of the register 211 in accordance with the motion class number supplied from the motion classifying unit 51, reads prediction coefficients stored therein and associated with a waveform class number supplied from the waveform classifying unit 53, and supplies the prediction coefficients to the sum-of-products calculating unit 57.

If the subject pixel is a pixel on an interpolated frame, the coefficient reading unit 54 refers to an area of the register 211 corresponding to the motion class number supplied from the motion classifying unit 51, reads prediction coefficients stored therein and associated with the waveform class number supplied from the waveform classifying unit 53, and supplies the prediction coefficients to the sum-of-products calculating unit 57.

For example, if the motion class number supplied from the motion classifying unit 51 is a number representing the motion class MC4, i.e., if motion is large, the coefficient reading unit 54 determines that the subject pixel is a corrupted pixel, so that the coefficient reading unit 54 refers to the area ma of the register 211 and reads prediction coefficients stored in the area ma.

On the other hand, if the motion class number supplied from the motion classifying unit 51 represents one of the motion classes MC1 to MC3, the coefficient reading unit 54 determines that the subject pixel is a correct pixel, and the coefficient reading unit 54 refers to the corresponding one of the areas mb1 to mb3 of the register 211 and reads prediction coefficients stored therein.

If the subject pixel is a pixel on a frame (frame t+1 of SD_24P signals) that is not an interpolated frame, the coefficient reading unit 54 refers to the area mb1 of the register 211, reads prediction coefficients stored therein and associated with the waveform class number supplied from the waveform classifying unit 53, and supplies the prediction coefficients to the sum-of-products calculating unit 57.

Next, a scheme of generation of coefficients by the coefficient generating unit 201 will be described.

Figure 34:
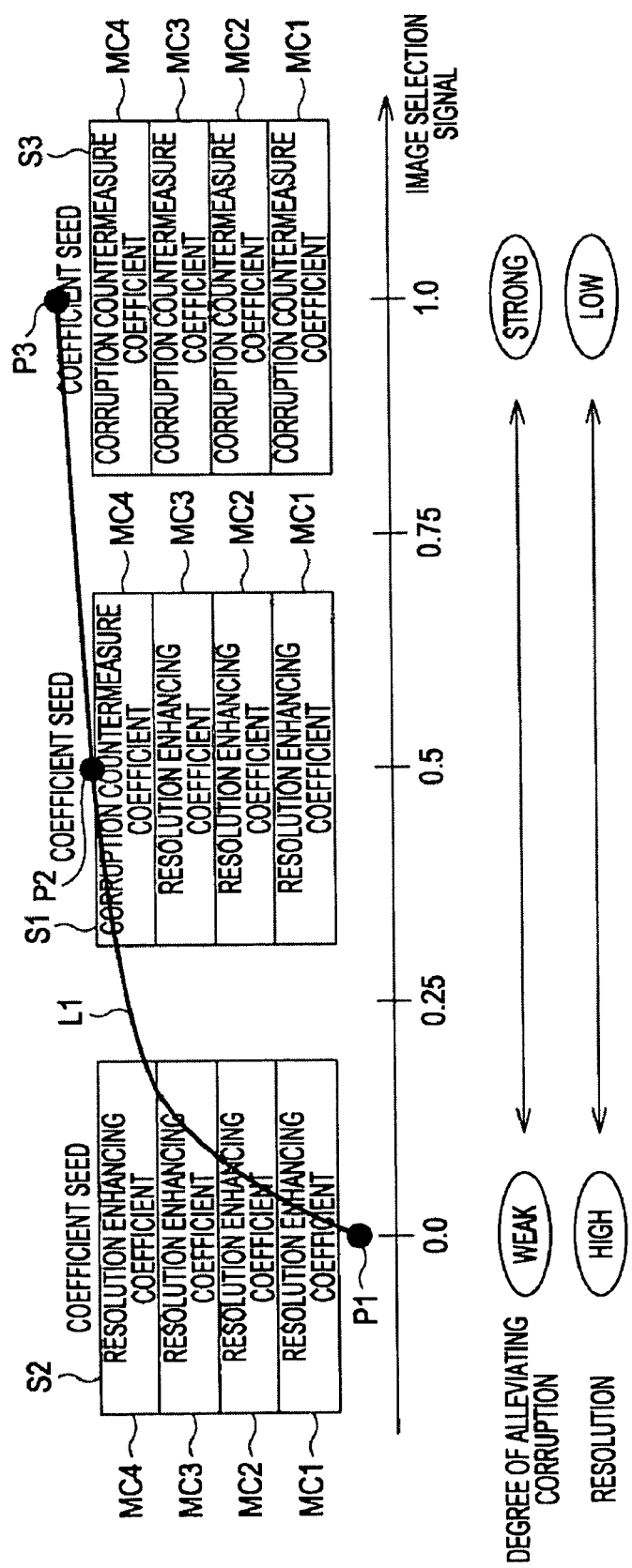
FIG. 34 is a diagram showing a scheme of relationship between image selection signals and coefficient seeds.

FIG. 34 schematically shows relationship between image selection signals and coefficient seeds. For example, the user is allowed to set the value of a parameter (having a value in a range of 0.0 to 1.0) for determining the degree of alleviation of corruption and determining resolution. As the value indicated by the image selection signal input by the user approaches 0.0, the degree of alleviating corruption becomes weaker and the resolution becomes higher. On the contrary, as the value indicated by the image selection signal approaches 1.0, the degree of alleviating corruption becomes stronger and the resolution becomes lower.

Thus, if the user wishes to enhance resolution at the compromise of weak degree of alleviating corruption (i.e., if the user gives priority to enhancing resolution than alleviating corruption), the user chooses a value closer to 0.0. On the contrary, if the user wishes to increase the degree of alleviating corruption at the compromise of a reduced resolution (i.e., if the user gives priority to alleviating corruption than enhancing resolution), the user chooses a value closer to 1.0. If the user wishes an intermediate degrees both for alleviating corruption and enhancing resolution, the user chooses a value close to 0.5.

The corresponding relationship between the three values indicated by the image selection signal and the three types of coefficient seeds S1 to S3 are defined as follows:

(image selection signal,coefficient seed)=(0.0,coefficient seed S2)

(image selection signal,coefficient seed)=(0.5,coefficient seed S1)

(image selection signal,coefficient seed)=(1.0,coefficient seed S3)

That is, when the value indicated by the image selection signal is 0.0, since the user wishes to give priority to enhancing resolution than alleviating corruption, as indicated by a point P1, the coefficient seed S2, composed of resolution enhancing coefficients for all the motion classes, is used.

When the value indicated by the image selection signal is 1.0, since the user wishes to give priority to alleviating corruption than enhancing resolution, as indicated by a point P3, the coefficient seed S3, composed of corruption counter measure coefficients for all the motion classes, are used.

When the value indicated by the image selection signal is 0.5, since the user wishes intermediate degrees for both alleviating corruption and enhancing resolution, as indicated by a point P2, the coefficient seed S1 is used, composed of corruption countermeasure coefficients for a motion class in which motion is large and the current subject pixel is determined as a corrupted pixel (i.e., the motion class MC4), and resolution enhancing coefficients for the other motion classes (i.e., the motion classes MC1 to MC3).

By approximating a function among the three values (0.0, 0.5, 1.0) indicated by the image selection signal by using these three corresponding relationships, it is possible to generate prediction coefficients continuously among the three values (0.0, 0.5, 1.0) of the image selection signal. For example, as a method of function approximation, fitting by a quadratic equation is used. Alternatively, although not described in detail, approximation by a linear first-order equation may be used.

Now, a specific example of generation of coefficients by the coefficient generating unit 201 will be described. As an example, a case where the user selects an image selection signal n by using the motion classifying unit 116 will be described.

Upon receiving the image selection signal n from the motion classifying unit 116, the coefficient generating unit 201 reads the coefficient seeds S1 to S3 stored in the coefficient seed memory 202. Then, by using the coefficient seeds S1 to S3 and the image selection signal n, the coefficient generating unit 201 generates prediction coefficients for each class in accordance with the image selection signal n in the following manner.

Let the coefficient seed S1 be denoted by $A_i$, the coefficient seed S2 by $B_i$, and the coefficient seed S3 by $C_i$. Here, I denotes the index of a prediction tap used for prediction of the pixel value of a pixel to be generated. Furthermore, let prediction coefficients for a class in accordance with the image selection signal n be denoted as $W_{ni}$. Then, the three corresponding relationships given earlier can be expressed by equations (14) below:

$$(n, W_{ni}) = (0.0, B_i)$$

$$(n, W_{ni}) = (0.5, A_i)$$

$$(n, W_{ni}) = (1.0, C_i) \tag{14}$$

A predicted value of a prediction coefficient corresponding to n can be expressed by a quadratic equation of n as in equation (15) below:

$$\text{Predictive value } \widehat{W_{ni}} = c_2 n^2 + c_1 n + c_0 \tag{15}$$

By using the least-square method for the prediction coefficients, the sum of squares of prediction errors can be expressed by equation (16) below:

$$E = \sum_{sample} (W_{ni} - \widehat{W_{ni}})^2 \tag{16}$$

$$= \sum_{sample} (W_{ni} - c_2 n^2 - c_1 n - c_0)^2$$

where "sample" denotes the number of learning pairs. In this case, "sample" is 3, as will be understood from equation (14).

In order to calculate $c_0$, $c_1$, and $c_2$ so that the sum E of squares of prediction errors is minimized, in equation (16), partial differentiation of each of $c_0$, $c_1$, and $c_2$ is to become 0, as expressed in equations (17) below:

$$\frac{\partial E}{\partial c_0} = 0$$
$$\frac{\partial E}{\partial c_1} = 0 \quad (17)$$
$$\frac{\partial E}{\partial c_2} = 0$$

Figure 35:
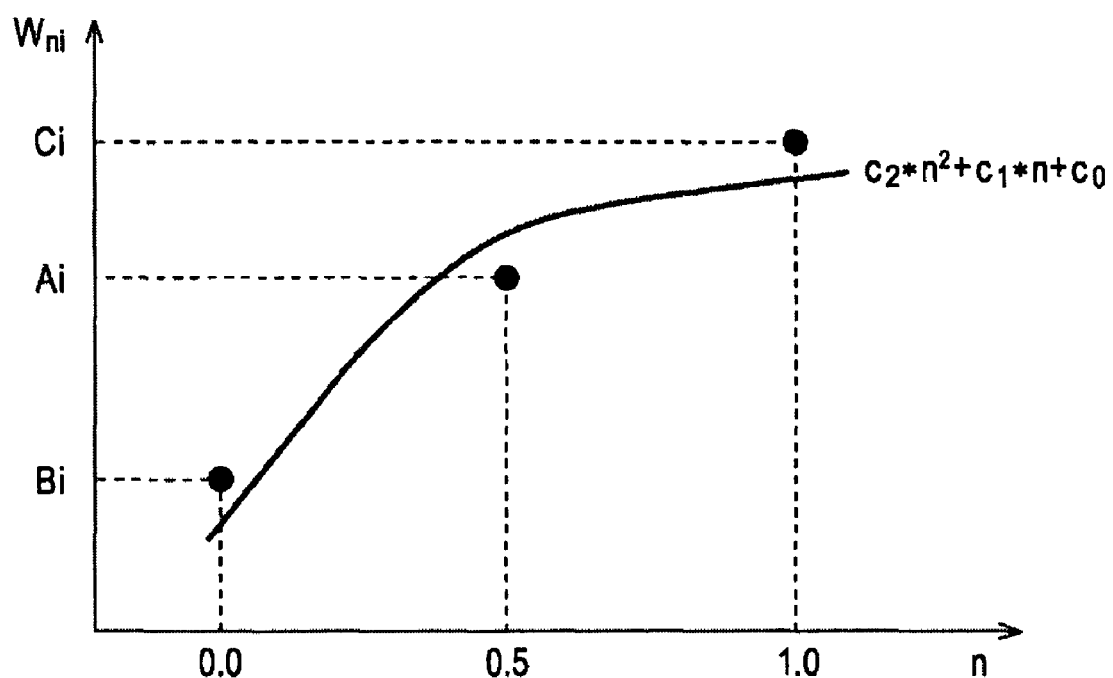
FIG. 35 is a diagram showing an example of prediction coefficients generated by fitting based on a quadratic equation.

By calculating $c_0$, $c_1$, and $c_2$ from equations (17), it is possible to generate continuous coefficients, as shown in FIG. 35. The coefficients generated are stored in the areas of the register 211 corresponding to individual motion classes until a next input of an image selection signal n by the user.

FIG. 35 shows an example of prediction coefficients generated by fitting by a quadratic equation.

In the example shown in FIG. 35, the horizontal axis represents the image selection signal n (0.0 to 1.0), and the vertical axis represents a coefficient $W_{ni}$ for a motion class in relation to the image selection signal n. Black dots indicate the corresponding relationships expressed in equations (14), and a curve indicate prediction coefficients generated according to equation (15).

As indicated by the curve, prediction coefficients are generated continuously in the range of 0.0 to 1.0 of the image selection signal. As indicated by the black dots and the curve in FIG. 35, at the values of 0.0, 0.5, and 1.0 of the image selection signal, the function approximation does not necessarily coincide with the corresponding prediction coefficients.

For example, if the value of the image selection signal is close to 1.0, a prediction coefficient close to the coefficient seed S3 on the curve L1 is generated. This prediction coefficient is used by the sum-of-products calculating unit 57, so that an image with a strong degree of alleviating corruption and with a low resolution is generated. If the value of the image selection signal is close to 0.0, a prediction coefficient close to the coefficient seed S2 on the curve L1 is generated. This prediction coefficient is used by the sum-of-products calculating unit 57, so that an image with a weak degree of alleviating corruption and with a high resolution is generated. If the value of the image selection signal is close to 0.5, a prediction coefficient close to the coefficient seed S1 on the curve L1 is generated. This prediction coefficient is used by the sum-of-products calculating unit 57, so that an image with an intermediate degree of alleviating corruption and with an intermediate resolution is generated.

Furthermore, for example, if the value of the image selection signal is close to 0.75, a prediction coefficient close to the middle of the coefficient seed S1 and the coefficient seed S3 on the curve L1 is generated. This prediction coefficient is used by the sum-of-products calculating unit 57, so that an image with a somewhat strong degree of alleviating corruption and with a somewhat lower resolution is generated. If the value of the image selection signal is close to 0.25, a prediction coefficient close to the middle of the coefficient seed S1 and the coefficient seed S2 on the curve L1 is generated. This prediction coefficient is used by the sum-of-products calculating unit 57, so that an image with a somewhat low degree of alleviating corruption and with a somewhat higher resolution is generated.

As described above, by allowing a user to set the value of a parameter that determines the degree of alleviating corruption and determines the resolution, and approximating the intervals of the three values (0.0, 0.5. 1.0) of the parameter by a function, it becomes possible to smoothly adjust the relationship between the degree of alleviating corruption and the resolution. Thus, the user can obtain a preferred image.

Figure 36:
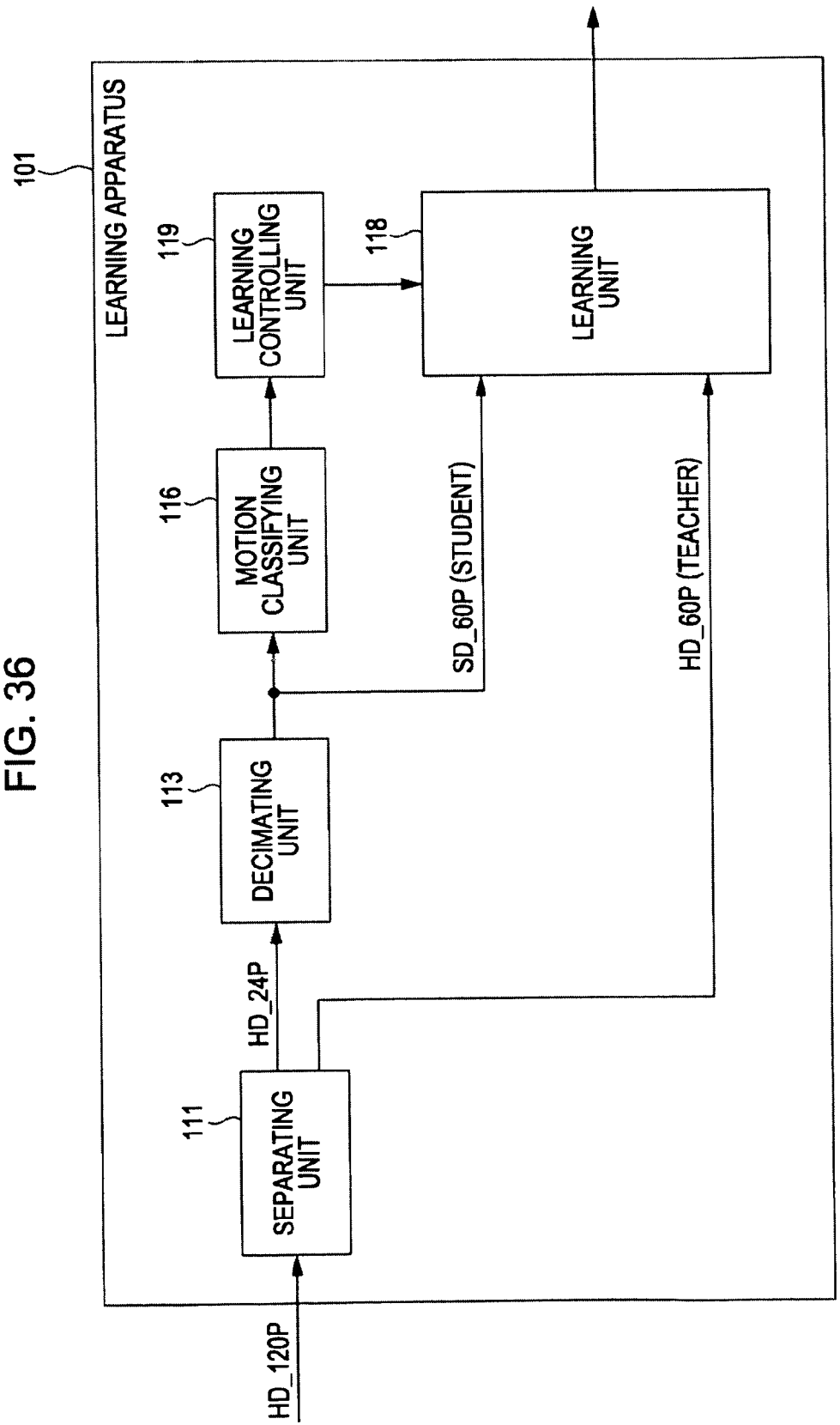
FIG. 36 is a block diagram showing another example configuration of a learning apparatus according to an embodiment of the present invention.

FIG. 36 shows an example of the learning apparatus 101 that generates prediction coefficients of the coefficient seed S2 by performing learning. Compared with the learning apparatus 101 shown in FIG. 10, in the learning apparatus 101 shown in FIG. 36, the decimating unit 112, the image converting unit 114, and the learning unit 117 are omitted.

More specifically, the learning apparatus 101 shown in FIG. 36 includes the separating unit 111, the decimating unit 113, the motion classifying unit 116, the learning unit 118, and the learning controlling unit 119. The motion classifying unit 116 classifies motion by calculating a feature from SD_60P signals supplied from the decimating unit 113 instead of gradient information input from the image converting unit 114 as a feature. For example, in the motion classifying unit 116 shown in FIG. 36, a feature calculated from a difference between frames or the like is used.

As described earlier with reference to FIG. 10, the learning unit 118 performs a learning process by using an image of SD_60P signals supplied from the decimating unit 113 as a student image and using an image of HD_60P signals supplied from the separating unit 111 as a teacher image. That is, since the image of SD_60P signals supplied from the decimating unit 113 are generated by separation from HD_60P signals, corruption due to the frame interpolation process does not occur. Therefore, the learning unit 118 performs a learning process by using correct pixels (an ordinary learning process for enhancing resolution).

As a result, resolution enhancing coefficients for the motion classes MC1 to MC4 of the coefficient seed S2 are generated. The prediction coefficients generated are supplied to and stored in the coefficient seed memory 202 shown in FIG. 32.

Although the prediction coefficients of the coefficient seed S1 are generated by the learning apparatus 101 shown in FIG. 10 or FIG. 19 in the example described above, as for the motion classes MC1 to MC3 of the coefficient seed S1, since the purpose is to generate resolution enhancing coefficients, prediction coefficients may be generated by the learning apparatus 101.

Figure 37:
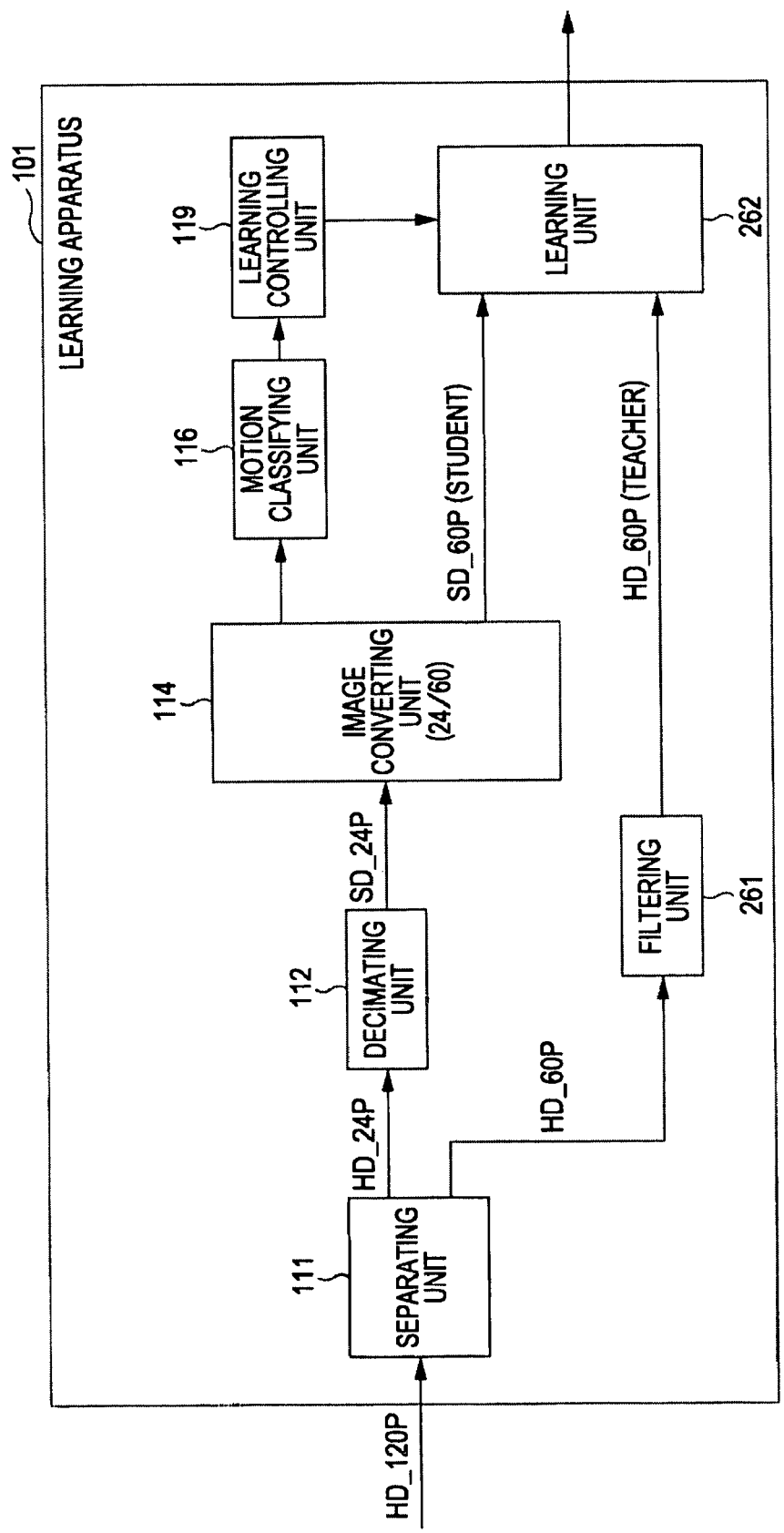
FIG. 37 is a block diagram showing another example configuration of a learning apparatus according to an embodiment of the present invention.

FIG. 37 shows an example configuration of a learning apparatus that generates prediction coefficients of the coefficient seed S3 by performing learning. Compared with the learning apparatus 101 shown in FIG. 10, the learning apparatus 101 shown in FIG. 37 does not include the decimating unit 113, the learning unit 117, and the learning unit 118, and additionally includes a filtering unit 261 and a learning unit 262.

That is, the learning apparatus 101 shown in FIG. 37 includes the separating unit 111, the decimating unit 112, the image converting unit 114, the motion classifying unit 116, the learning controlling unit 119, the filtering unit 261, and the learning unit 262.

The separating unit 111 HD_24P signals generated by separation to the decimating unit 112, and supplies HD_60P signals generated by separation to the filtering unit 261.

The filtering unit 261 filters the image of HD_60P signals supplied from the separating unit 111 to cause blurring, and supplies an image of HD_60P signals with a reduced resolution to the learning unit 262.

The learning unit 262 performs a learning process by using the image of SD_60P signals supplied from the image converting unit 114 as a student image and using the image of HD_60P signals supplied from the filtering unit 261 as a teacher image.

Since the learning unit 262 is configured substantially the same as the learning unit 117 described earlier with reference to FIG. 12, the configuration of the learning unit 262 is not shown or described in detail. The learning unit 262 solves a normal equation generated for each motion class number (motion classes MC1 to MC4) from the motion classifying unit 116 for each waveform class, thereby obtaining an optimal prediction coefficient $w_i$ for each motion class for each waveform class. The prediction coefficient obtained is stored in the coefficient seed memory 202 shown in FIG. 32.

Since the SD_60P signals supplied from the image converting unit 114 are obtained by conversion of SD_24P signals by the frame interpolation process, the SD_60P signals include corrupted pixels. Furthermore, the HD_60P signals supplied from the filtering unit 261 are obtained by blurring with a filter.

By using the HD_60P signals with blurring as a teacher image, the learning unit 262 can generate prediction coefficients for generating a blurred image, i.e., corruption countermeasure coefficients for increasing the degree of alleviating corruption. That is, the learning unit 262 performs a learning process similar to a learning process performed by using corrupted pixels for all the classes.

As a result, corruption countermeasure coefficients for the motion classes MC1 to MC4 of the coefficient seed S3 are generated, and the predication coefficients are supplied to and stored in the coefficient seed memory 202 shown in FIG. 32.

As described above, a coefficient seed with priority given to enhancing resolution, a coefficient seed with priority given to alleviating corruption, and an intermediate coefficient seed are obtained in advance and stored, and prediction coefficients are generated and used in accordance with user preference by using the coefficient seeds. Thus, for example, it is possible to alleviate corruption of an image due to error in assignment of a detected vector and to enhance resolution.

Furthermore, a user can smoothly adjust the relationship between the degree of alleviating corruption and resolution in accordance with preference. Thus, the user can view an image with a preferred degree of alleviating corruption and enhancing resolution.

Although three types of coefficient seeds are stored in the example described above, more than three types of coefficient seeds may be stored.

Hereinabove, an example based on motion classes has been described. However, although not shown or described in detail, the art of obtaining in advance and storing a coefficient seed with priority given to enhancing resolution, a coefficient seed with priority given to alleviating corruption, and an intermediate coefficient seed so that prediction coefficients can be generated and used in accordance with user preference by using the stored coefficient seeds can be applied to the image converting unit 32 shown in FIG. 16 and the learning apparatus 101 shown in FIG. 18 in the case of using irregularity evaluation values.

The series of processes described above can be executed by hardware or software. When the series of processes are executed by software, programs constituting the software is installed from a program recording medium onto a computer embedded in special hardware or onto a general-purpose personal computer or the like that is capable of executing various functions with various programs installed thereon.

As shown in FIG. 3, the program recording medium for storing programs that are installed onto a computer for execution by the computer may be the removable medium 21, which is a package medium such as a magnetic disk (e.g., a flexible disk), an optical disc (e.g., a CD-ROM (compact disc read-only memory), a DVD (digital versatile disc), or a magneto-optical disc), or a semiconductor memory, or the ROM 12 or the hard disk of the storage unit 18 temporarily or permanently storing the programs. The programs can be stored on the program recording medium as needed via the communication unit 19 which is an interface such as a router, modem, etc., using wired or wireless communication medium, such as a local area network, the Internet, or digital satellite broadcasting.

It is to be understood that steps defining the programs stored on the program recording medium may include processes that are executed in parallel or individually, as well as processes that are executed in the orders described in this specification.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   determining means for determining whether an image is corrupted at a pixel constituting a second image, the second image being generated by a frame interpolation process, the frame interpolation process being a process of detecting a motion vector on a frame of a first image, assigning the motion vector detected to a pixel on a frame of the second image, and generating a pixel value of the pixel on the frame of the second image on the basis of the motion vector assigned;
   class-tap extracting means for extracting from the second image, as class taps, a plurality of predetermined pixels of the second image, the plurality of predetermined pixels including a subject pixel under consideration in the second image, and the plurality of predetermined pixels being used for classification of a pixel to be generated of a third image into one of a plurality of classes, the third image having a higher resolution than the second image, and the pixel to be generated being located at a position corresponding to the subject pixel of the second image;
   classifying means for performing classification of the pixel to be generated by using the class taps;
   prediction-tap extracting means for extracting from the second image, as prediction taps, a plurality of predetermined pixels of the second image, the plurality of predetermined pixels including the subject pixel and being used for prediction of the pixel to be generated; and
   predictive calculating means for generating the third image by predictive calculation, the predictive calculating means predictively calculating a pixel value of the pixel to be generated by using the prediction taps and using prediction coefficients for the class of the pixel to be generated determined by the classifying means among a first prediction coefficient set in a case where the subject pixel is determined by the determining means as a pixel representing a corrupted image, the first prediction coefficient set including prediction coefficients obtained in advance by using pixels representing corrupted images, and the predictive calculating means predictively calculating a pixel value of the pixel to be generated by using the prediction taps and using prediction coefficients for the class of the pixel to be generated determined by the classifying means among a second prediction coefficient set in a case where the subject pixel is determined by the determining means as a pixel representing an uncorrupted image, the second prediction coefficient set including prediction coefficients obtained in advance by using pixels representing uncorrupted images, wherein the determining means calculates a value representing variation between the motion vector assigned to the subject pixel of the second image and motion vectors assigned to neighboring pixels in a predetermined neighboring range of the subject pixel, and determines whether the image is corrupted at the subject pixel on the basis of the value representing variation between these motion vectors.

2. An image processing method comprising the steps of:

determining whether an image is corrupted at a pixel constituting a second image, the second image being generated by a frame interpolation process, the frame interpolation process being a process of detecting a motion vector on a frame of a first image, assigning the motion vector detected to a pixel on a frame of the second image, and generating a pixel value of the pixel on the frame of the second image on the basis of the motion vector assigned;

extracting from the second image, as class taps, a plurality of predetermined pixels of the second image, the plurality of predetermined pixels including a subject pixel under consideration in the second image, and the plurality of predetermined pixels being used for classification of a pixel to be generated of a third image into one of a plurality of classes, the third image having a higher resolution than the second image, and the pixel to be generated being located at a position corresponding to the subject pixel of the second image;

performing classification of the pixel to be generated by using the class taps;

extracting from the second image, as prediction taps, a plurality of predetermined pixels of the second image, the plurality of predetermined pixels including the subject pixel and being used for prediction of the pixel to be generated; and generating the third image by predictively calculating a pixel value of the pixel to be generated by using the prediction taps and using prediction coefficients for the class of the pixel to be generated according to the classification among a first prediction coefficient set in a case where the subject pixel is determined as a pixel representing a corrupted image, the first prediction coefficient set including prediction coefficients obtained in advance by using pixels representing corrupted images, and by predictively calculating a pixel value of the pixel to be generated by using the prediction taps and using prediction coefficients for the class of the pixel to be generated according to the classification among a second prediction coefficient set in a case where the subject pixel is determined as a pixel representing an uncorrupted image, the second prediction coefficient set including prediction coefficients obtained in advance by using pixels representing uncorrupted images, wherein the determining includes calculating a value representing variation between the motion vector assigned to the subject pixel of the second image and motion vectors assigned to neighboring pixels in a predetermined neighboring range of the subject pixel, and determining whether the image is corrupted at the subject pixel on the basis of the value representing variation between these motion vectors.

3. A non-transitory computer readable medium including a program for causing a computer to execute image processing comprising the steps of:

determining whether an image is corrupted at a pixel constituting a second image, the second image being generated by a frame interpolation process, the frame interpolation process being a process of detecting a motion vector on a frame of a first image, assigning the motion vector detected to a pixel on a frame of the second image, and generating a pixel value of the pixel on the frame of the second image on the basis of the motion vector assigned;

extracting from the second image, as class taps, a plurality of predetermined pixels of the second image, the plurality of predetermined pixels including a subject pixel under consideration in the second image, and the plurality of predetermined pixels being used for classification of a pixel to be generated of a third image into one of a plurality of classes, the third image having a higher resolution than the second image, and the pixel to be generated being located at a position corresponding to the subject pixel of the second image;

performing classification of the pixel to be generated by using the class taps;

extracting from the second image, as prediction taps, a plurality of predetermined pixels of the second image, the plurality of predetermined pixels including the subject pixel and being used for prediction of the pixel to be generated; and generating the third image by predictively calculating a pixel value of the pixel to be generated by using the prediction taps and using prediction coefficients for the class of the pixel to be generated according to the classification among a first prediction coefficient set in a case where the subject pixel is determined as a pixel representing a corrupted image, the first prediction coefficient set including prediction coefficients obtained in advance by using pixels representing corrupted images, and by predictively calculating a pixel value of the pixel to be generated by using the prediction taps and using prediction coefficients for the class of the pixel to be generated according to the classification among a second prediction coefficient set in a case where the subject pixel is determined as a pixel representing an uncorrupted image, the second prediction coefficient set including prediction coefficients obtained in advance by using pixels representing uncorrupted images, wherein the determining includes calculating a value representing variation between the motion vector assigned to the subject pixel of the second image and motion vectors assigned to neighboring pixels in a predetermined neighboring range of the subject pixel, and determining whether the image is corrupted at the subject pixel on the basis of the value representing variation between these motion vectors.

4. An image processing apparatus comprising:

a determining circuit configured to determine whether an image is corrupted at a pixel constituting a second image, the second image being generated by a frame interpolation process, the frame interpolation process being a process of detecting a motion vector on a frame of a first image, assigning the motion vector detected to a pixel on a frame of the second image, and generating a pixel value of the pixel on the frame of the second image on the basis of the motion vector assigned;

a class-tap extracting circuit configured to extract from the second image, as class taps, a plurality of predetermined pixels of the second image, the plurality of predetermined pixels including a subject pixel under consideration in the second image, and the plurality of predetermined pixels being used for classification of a pixel to be generated of a third image into one of a plurality of classes, the third image having a higher resolution than the second image, and the pixel to be generated being located at a position corresponding to the subject pixel of the second image;

a classifying circuit configured to perform classification of the pixel to be generated by using the class taps;

a prediction-tap extracting circuit configured to extract from the second image, as prediction taps, a plurality of predetermined pixels of the second image, the plurality of predetermined pixels including the subject pixel and being used for prediction of the pixel to be generated; and a predictive calculating circuit configured to generate the third image by predictive calculation, the predictive calculating circuit predictively calculating a pixel value of the pixel to be generated by using the prediction taps and using prediction coefficients for the class of the pixel to be generated determined by the classifying circuit among a first prediction coefficient set in a case where the subject pixel is determined by the determining circuit as a pixel representing a corrupted image, the first prediction coefficients set including prediction coefficients obtained in advance by using pixels representing corrupted images, and the predictive calculating circuit predictively calculating a pixel value of the pixel to be generated by using the prediction taps and using prediction coefficients for the class of the pixel to be generated determined by the classifying circuit among a second prediction coefficient set in a case where the subject pixel is determined by the determining circuit as a pixel representing an uncorrupted image, the second prediction coefficient set including prediction coefficients obtained in advance by using pixels representing uncorrupted images, wherein the determining circuit calculates a value representing variation between the motion vector assigned to the subject pixel of the second image and motion vectors assigned to neighboring pixels in a predetermined neighboring range of the subject pixel, and determines whether the image is corrupted at the subject pixel on the basis of the value representing variation between these motion vectors.

\* \* \* \* \*